US007681583B2

(12) United States Patent
Bolt et al.

(10) Patent No.: US 7,681,583 B2
(45) **Date of Patent: *Mar. 23, 2010**

(54) DOUBLE-WALLED CONTAINED SHEAR VALVE, PARTICULARLY FOR FUELING ENVIRONMENTS

(75) Inventors: David J. Bolt, Newry, PA (US); Dale Ewing, Hollidaysburg, PA (US); Shane Reese, Hollidaysburg, PA (US); Kent Reid, Canton, CT (US)

(73) Assignee: Veeder-Root Company, Simsbury, CT (US)

( * ) Notice: Subject to any disclaimer, the term of this patent is extended or adjusted under 35 U.S.C. 154(b) by 820 days.

This patent is subject to a terminal disclaimer.

(21) Appl. No.: 11/354,886

(22) Filed: Feb. 15, 2006

(65) Prior Publication Data

US 2006/0191569 A1 Aug. 31, 2006

Related U.S. Application Data

(60) Provisional application No. 60/654,390, filed on Feb. 18, 2005.

(51) Int. Cl.
*F16K 17/14* (2006.01)

(52) U.S. Cl. .................................................. 137/68.14

(58) Field of Classification Search .............. 137/68.14, 137/68.19, 68.21, 68.23, 247.39, 68.11, 71
See application file for complete search history.

(56) References Cited

U.S. PATENT DOCUMENTS 2,642,086 A 6/1953 Conklin et al.
2,665,714 A 1/1954 Greenwood
2,965,116 A 12/1960 Boone et al.
3,209,773 A 10/1965 Klaus
3,630,214 A * 12/1971 Levering ................ 137/68.15
3,719,194 A * 3/1973 Anderson et al. ........ 137/68.15
3,782,401 A * 1/1974 Moore et al. ............ 137/68.14
3,794,057 A * 2/1974 Badger .................... 137/68.15

(Continued)

OTHER PUBLICATIONS

OPW Brochure Regarding Emergency Shut-Off Valve, copyright 2007.

(Continued)

*Primary Examiner*—John Rivell
*Assistant Examiner*—Macade Brown
(74) *Attorney, Agent, or Firm*—Nelson Mullins Riley & Scarborough LLP

(57) ABSTRACT

A double-walled contained shear valve comprises of an inner housing forming a fuel flow path, and a containment housing surrounding the inner housing, either partially or wholly, to provide a secondary containment. An interstitial space is formed between the inner housing and the containment housing as a result, and may be placed under a vacuum or pressure level to monitor for leaks. A vacuum actuator coupled to the interstitial space automatically opens and closes the fuel flow path of the shear valve in response to the vacuum level in the interstitial space to prevent leaks to the environment. The shear valve may contain a flange for connection to internal fuel dispenser piping that either does or does not includes interstitial space orifices to couple the shear valve interstitial space to the fuel dispenser piping interstitial space to monitor the vacuum or pressure level in these interstitial spaces as one contiguous space.

28 Claims, 20 Drawing Sheets

U.S. PATENT DOCUMENTS

| | | | | | |
|---|---|---|---|---|---|
| 3,860,025 | A | | 1/1975 | Nelson | |
| 3,995,694 | A | * | 12/1976 | Freiburger | 166/285 |
| 4,067,359 | A | | 1/1978 | Kwast | |
| 4,131,142 | A | | 12/1978 | Barr et al. | |
| 4,307,744 | A | * | 12/1981 | Marrison | 137/68.11 |
| 5,054,509 | A | | 10/1991 | Grantham | |
| 5,098,221 | A | | 3/1992 | Osborne | 405/52 |
| 5,099,870 | A | | 3/1992 | Moore et al. | |
| 5,120,488 | A | * | 6/1992 | Borrman et al. | 376/203 |
| 5,244,006 | A | | 9/1993 | Pettesch | 137/71 |
| 5,285,829 | A | | 2/1994 | Bravo | 141/88 |
| 5,289,842 | A | | 3/1994 | Bravo | 137/68.1 |
| 5,297,896 | A | | 3/1994 | Webb | 405/52 |
| 5,299,607 | A | | 4/1994 | Monticup, Jr. | |
| 5,341,857 | A | | 8/1994 | Bravo | 141/88 |
| 5,351,707 | A | | 10/1994 | Bravo | 137/68.1 |
| 5,427,474 | A | | 6/1995 | Silvers | 405/52 |
| 5,490,419 | A | | 2/1996 | Webb | 73/40.5 R |
| 5,527,130 | A | | 6/1996 | Webb | 405/52 |
| 5,529,098 | A | | 6/1996 | Bravo | 141/88 |
| 5,553,971 | A | | 9/1996 | Osborne | 405/52 |
| 5,567,083 | A | | 10/1996 | Osborne | 405/154 |
| 5,590,981 | A | | 1/1997 | Osborne | 405/154 |
| 5,713,607 | A | | 2/1998 | Webb | 285/133.1 |
| 5,717,564 | A | | 2/1998 | Lindale | 361/600 |
| 5,758,682 | A | * | 6/1998 | Cain | 137/68.14 |
| 5,775,842 | A | | 7/1998 | Osborne | 405/154 |
| 5,831,149 | A | | 11/1998 | Webb | 73/40.5 R |
| 5,927,762 | A | | 7/1999 | Webb | 285/123.15 |
| 6,003,554 | A | | 12/1999 | Magdelyns et al. | |
| 6,116,817 | A | | 9/2000 | Osborne | 405/154 |
| 6,182,679 | B1 | | 2/2001 | Pendleton | 137/68.14 |
| 6,371,154 | B1 | | 4/2002 | Kesterman et al. | 137/315.01 |
| 7,503,205 | B2 | | 3/2009 | Baillargeon et al. | |
| 2004/0045343 | A1 | | 3/2004 | Hutchinson | 73/45.5 R |
| 2004/0149017 | A1 | | 8/2004 | Hutchinson et al. | 73/40.5 R |
| 2004/0182136 | A1 | | 9/2004 | Halla et al. | 73/49.2 |
| 2004/0261504 | A1 | | 12/2004 | Hutchinson et al. | 73/49.2 |
| 2006/0185729 | A1 | | 8/2006 | Ingram | |
| 2006/0191568 | A1 | | 8/2006 | Bolt et al. | |
| 2006/0249204 | A1 | | 11/2006 | Bolt et al. | |
| 2006/0260387 | A1 | | 11/2006 | Baillargeon et al. | |
| 2006/0260680 | A1 | | 11/2006 | Reid et al. | |

OTHER PUBLICATIONS

Office Action issued Aug. 10, 2009 by the United States Patent and Trademark Office regarding U.S. Appl. No. 11/411,182.

Final Office Action issued by the USPTO on Oct. 15, 2009 for copending U.S. Appl. No. 11/354,394.

Office Action issued by the USPTO on Sep. 3, 2009 for copending U.S Appl. No. 11/433,140.

* cited by examiner

FUEL FLOW TO DISPENSER (110)

FUEL FLOW FROM UST

DOUBLE-WALLED CONTAINED SHEAR VALVE, PARTICULARLY FOR FUELING ENVIRONMENTS

FIELD OF THE INVENTION

This application claims priority to U.S. Provisional Patent Application No. 60/654,390 entitled "DOUBLE WALL CONTAINED SHEAR VALVE, PARTICULARLY FOR FUELING ENVIORNMENTS," filed on Feb. 18, 2005, and incorporated herein by reference in its entirety.

BACKGROUND OF THE INVENTION

The present invention relates to a double-walled contained shear valve, particularly for use in fueling environments, wherein the shear valve is comprised of a fuel flow path surrounded by an interstitial space to provide secondary containment and leak detection/prevention. The double-walled shear valve is designed to close the fuel flow path in response to either a shear or a loss of vacuum in the interstitial space or other system having a separate interstitial space.

BACKGROUND OF THE INVENTION

In service station environments, fuel is delivered to fuel dispensers from underground storage tanks (UST), sometimes referred to as fuel storage tanks. USTs are large containers located beneath the ground that hold fuel. A separate UST is provided for each fuel type, such as low octane gasoline, high-octane gasoline, and diesel fuel. In order to deliver the fuel from the USTs to the fuel dispensers, typically, a submersible turbine pump (STP) is provided that pumps the fuel out of the UST and delivers the fuel through a main fuel piping conduit that runs beneath the ground in the service station. Other types of pumps other than a STP, such as a self-contained pump within the dispenser housing for example, may be employed.

Due to environmental and possible regulatory requirements governing service stations, the main fuel piping conduit is usually required to be double-walled piping. Double-walled piping contains an inner piping that carries the fuel. An outer piping forming an outer annular space, also called an "interstitial space," surrounds the inner piping so as to capture and contain any leaks that occur in the inner piping, so that such leaks do not reach the ground. An example of double-walled fuel pipe is disclosed in U.S. Pat. No. 5,527,130, incorporated herein by reference in its entirety.

It is possible that the inner piping of the double-walled fuel piping could fail, thereby leaking fuel to the interstitial space of the double-walled fuel piping. Or, it is possible that the outer piping of the double-walled fuel piping could fail thereby leaking fuel captured in the interstitial space. In either scenario, without monitoring of the double-walled fuel piping interstitial space, it is possible that a leak in the double-walled fuel piping will go undetected for some period of time. The STP will continue to operate as normal, drawing fuel from the UST; however, the fuel may leak to the ground instead of being delivered to the fuel dispensers.

Recent proposed changes in state and federal regulations will tighten the requirements to contain leaks and will further require better leak detection so that environmental damage may be minimized. As a result, it is becoming imperative that all potential leak sources be evaluated and steps taken to detect and contain leaks in the piping systems.

Methods of monitoring the interstitial space of fuel piping are disclosed in U.S. Patent Application Publication Nos. 2004/0045343; 2004/0149017; and 2004/0182136, which are all hereby incorporated by reference in their entireties. In these systems, a vacuum-generating source, which may be the STP, draws a vacuum in the interstitial space. Thereafter, the interstitial space is monitored for pressure changes. If sufficient pressure changes occur, this is an indication that either the inner piping or the outer piping of the double-walled fuel piping has incurred a leak or breach. The leak or breach could have occurred in any branch or zone of the fuel piping in which the interstitial space is being monitored.

Double-walled fuel piping is located outside of the fuel dispenser beneath the ground in conduits that deliver fuel from the STP to the fuel dispensers. Main fuel piping delivers fuel underneath the fuel dispensers. Double-walled branch fuel piping, typically located within a dispenser sump located beneath ground under individual fuel dispensers, connects the individual fuel dispensers to the main fuel piping to receive fuel for dispensing through its respective hose and nozzle. However, as illustrated in FIG. 5 of U.S. Pat. No. 5,713,607, incorporated herein by reference in its entirety, the interstitial space of the double-walled branch fuel piping, or riser pipe "$P_R$" terminates on the inlet side of the shear valve "$V_S$". Therefore, the interstitial space, if monitored, is only monitored to a point that stops before the inner fuel piping couples to the shear valve.

Fuel dispensers also contain internal fuel piping or conduits that carry the fuel from the outlet side of the shear valve through various components, such as valves and meters, internal to the fuel dispenser before the fuel exits through the hose and nozzle into a vehicle fuel tank. This dispenser internal fuel piping is not double-walled fuel piping; however, the internal fuel piping can incur a breach as well. If this internal fuel piping is not contained and monitored, the leak can continue to occur without notification, and the STP will continue to operate as normal, drawing fuel from the UST and possibly leaking fuel to the ground. A solution to this issue is provided in U.S. Patent Application Publication No. 2004/0261504, which is hereby incorporated herein by reference in its entirety (hereinafter the "'504 application").

In the '504 application, a double-walled shear valve is provided between double-walled branch fuel piping located beneath the fuel dispenser and double-walled fuel piping located internal to the fuel dispenser so that the interstitial space of the branch fuel piping is coupled to the interstitial space internal fuel piping for monitoring of breaches or leaks in the fuel piping. Further, by providing a secondarily contained shear valve, the interstitial space around the shear valve can be monitored for breaches or leaks as well.

Therefore, as discussed in the '504 application, it may be desirable to provide secondary containment of the internal fuel piping to the fuel dispenser so that breaches that occur in the internal fuel piping are also contained. Further, it may be desirable to monitor the secondary containment space of the internal fuel piping so that breaches that occur in either the inner or outer fuel piping are detected for the reasons stated above. However, any fuel piping, fittings or couplings, such as the shear valve for example, that are not secondarily contained provide a failure point in the system where a leak will not be contained.

Further, if it is desirable to use the same vacuum generating source that draws a vacuum in the main and/or branch fuel piping interstitial space as the vacuum generating source to draw a vacuum in the interstitial space of the internal fuel piping, the interstitial space of the internal fuel piping must be fluidly coupled to the interstitial space of the branch and/or main fuel piping. Otherwise, a separate vacuum generating source will be required.

Therefore, the present invention provides a double-wall contained shear valve to solve one or more of the aforementioned problems which are also disclosed in the '504 application. The first problem is that fuel that leaks at the shear valve will not be contained even if the branch fuel piping located on the inlet side of the shear valve, or the internal fuel dispenser piping located on the outlet side of the shear valve, is double-walled piping. A double-walled shear valve must be used that still shears properly in the event of an impact even with double-walled containment. A double-walled contained shear valve can provide an interstitial space around the inner housing of the shear valve for monitoring any leaks or breaches in the inner or containment housings of the shear valve for the reasons stated above. The third problem is that the shear valve's fuel flow path should be closed in response to a leak to prevent further leakage.

SUMMARY OF THE INVENTION

The present invention is directed to a double-walled shear valve, preferably for use in a fuel dispenser. The double-walled shear valve contains an inner housing forming a fuel flow path. An outer housing or containment housing is provided that surrounds either partially or wholly the inner housing to provide a second containment. The containment housing may also provide part of the fuel flow path. An interstitial space is formed between the inner housing and the containment housing. In this manner, a leak that results due to breach of an inner housing of the shear valve may be contained within the interstitial space between the inner and containment housing instead of leaking to the environment.

The interstitial space can further be placed under a vacuum or pressure. The vacuum or pressure level within the interstitial space is monitored to detect breaches in either the inner housing or the containment housing of the shear valve, which may be caused by a shear of the shear valve for example. The interstitial space is monitored for pressure or vacuum level variations. If the pressure or vacuum level varies beyond thresholds or expectations, a leak may be present.

In another embodiment of the invention, the double-walled shear valve contains a vacuum actuator. The vacuum actuator is coupled to the interstitial space of the double-walled shear valve. The vacuum actuator responds to generation of vacuum levels or loss thereof in the interstitial space or other system having a separate interstitial space. When a sufficient vacuum level is maintained, the vacuum actuator keeps a main poppet valve within the fuel flow path of the shear valve open to allow fuel to flow through the shear valve. The main poppet valve is kept open as long as a sufficient vacuum level is maintained in the interstitial space. If a leak or shear occurs, the interstitial space loses vacuum level. In response, the vacuum actuator automatically causes the main poppet valve to close thereby closing off the fuel flow path within the shear valve to prevent fuel from leaking to the environment. Once a sufficient vacuum level is restored in the interstitial space, the vacuum actuator automatically reopens the main poppet valve to open to allow fuel to flow through the shear valve once again.

In another embodiment of the invention, the double-walled shear valve is fitted with a main poppet valve that can be opened by the vacuum actuator with less force than normally required once the vacuum level in the interstitial space is restored. For example, if there is pump pressure trapped on the upstream side of the main poppet valve and little or no pressure or atmospheric pressure on the downstream side, more force than can be provided by the vacuum actuator may be required to open the main poppet valve once the vacuum level in the interstitial space is restored. The main poppet valve contains an inner diameter seal fitted to an inner diameter tube coupled to the downstream side of the valve. Once the inner diameter seal is opened, the inner diameter tube is coupled to the upstream side of the main poppet valve to begin to equalize pressure across the main poppet valve. The inner diameter tube has a diameter less than the diameter of the fuel flow path. Thus, less force is required to open the inner diameter seal than to open the main poppet valve seal, because the main poppet valve seal rests against the entire, larger diameter of the fuel flow path. When the inner diameter seal is opened, the pressure differential between the upstream and downstream side of the main poppet valve starts to equalize. As this equalization occurs, the force required to open the main poppet valve seal is lessened thereby allowing the vacuum actuator to completely open the main poppet valve and thus reset the shear valve to an operational condition.

The shear valve may also be designed to allow automatic coupling of its interstitial space to the interstitial space of a branch fuel piping and/or internal fuel dispenser piping when such fuel piping is coupled to the shear valve. In this manner, a monitoring system that is used to monitor the interstitial space of fuel piping can also be used to monitor the interstitial space of the shear valve as one single monitored zone.

In another embodiment of the invention, the interstitial space of the double-walled shear valve is blocked from extending beyond the outlet of the shear valve. In this manner, the interstitial space of the shear valve is not coupled to an interstitial space of the internal fuel dispenser piping. Thus, a monitoring system that monitors the pressure or vacuum level of the double walled shear valve is not designed or intended to also monitoring of the interstitial space of the internal fuel dispenser piping. For example, it may be desired to sell this version of the double-walled shear valve to customers that either do not support or are not authorized to support the monitoring of the internal fuel dispenser piping.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is directed to a double-walled shear valve, preferably for use in a fuel dispenser in a fueling environment. The shear valve contains an outer or containment housing to provide a second containment around an inner housing. The inner and containment housings also contain orifices within that are coupled together to provide a fuel flow path through the shear valve. An interstitial space is formed between the inner housing and the containment housing. In this manner, a leak that results due to a breach of the inner housing of the shear valve is contained within the interstitial space between the inner and containment housings.

The interstitial space can further be placed under a vacuum or pressure. The vacuum or pressure level within the interstitial space is monitored to detect breaches in either the inner housing or the containment housing of the shear valve, and/or a shear of the shear valve. For example, if a vacuum is applied to the interstitial space of the shear valve, the interstitial space can be monitored for pressure variations. A vacuum actuator controls the opening and closing of a main poppet valve located inline to the fuel flow path of the shear valve in response to vacuum generation and loss in the interstitial space or other system having a separate interstitial space.

Figure 1:
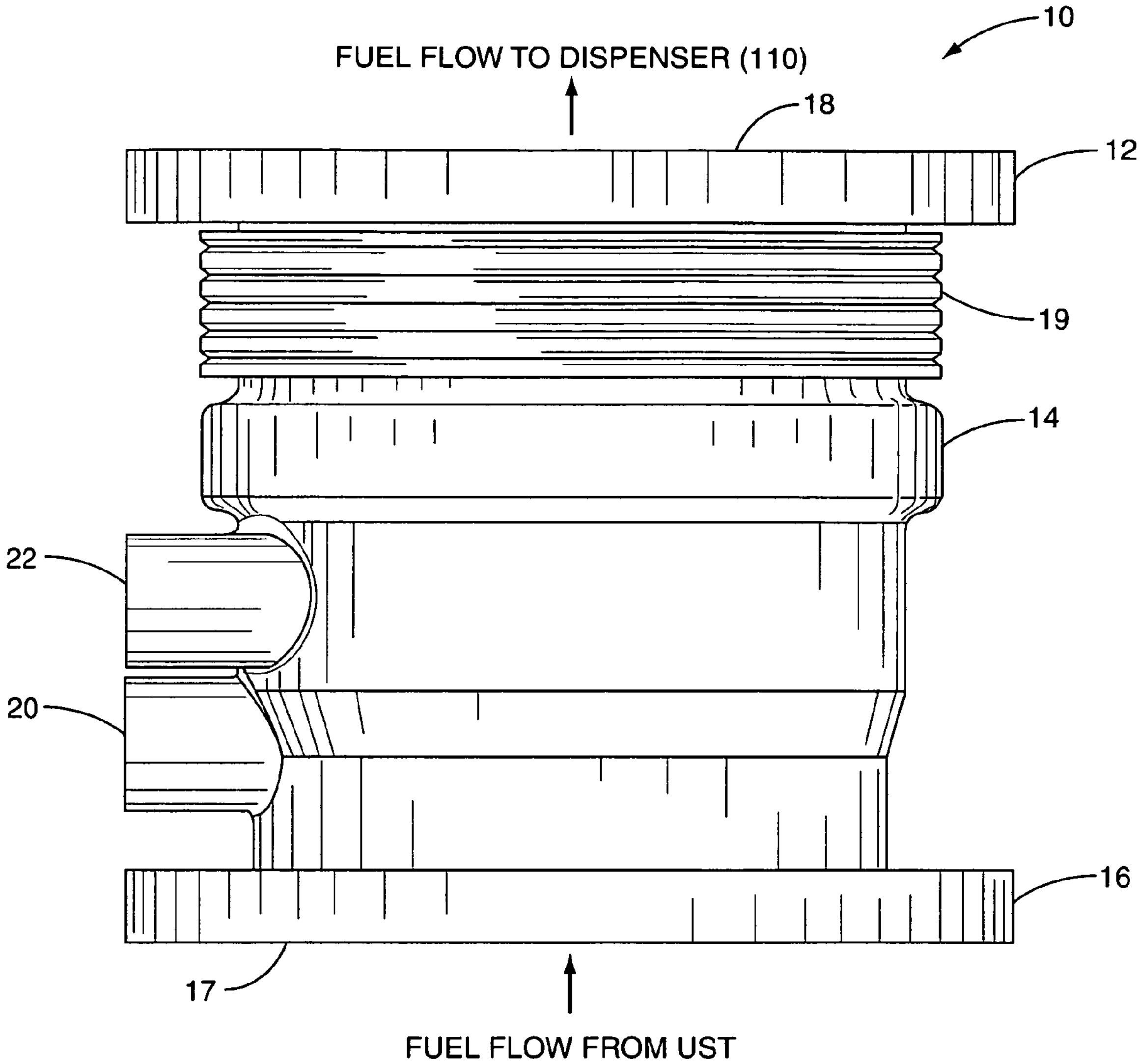
FIG. 1 is an exemplary illustration of a double-walled contained shear valve in accordance with the present invention.

The shear valve in accordance with one embodiment of the present invention is illustrated in the external view diagram in FIG. 1. In FIG. 1, the shear valve (generally designated as element 10) is illustrated from a side view. The shear valve 10 is comprised of three housings fitted together to form one shear valve 10. The shear valve 10 is comprised of a downstream housing 12, which is coupled to a containment housing or containment housing 14, which in turn is coupled to an upstream housing 16. This patent application will describe the inner connections between these housings 12, 14, and 16 in FIG. 3 below.

An orifice (not shown in FIG. 1) in the upstream housing 16 provides an inlet 17 for fuel to flow from the underground storage tank (not shown in FIG. 1) through an internal fuel flow path (not shown in FIG. 1) of the shear valve 10. The fuel that flows through the inlet 17 through the fuel flow path internal to the shear valve 10 exits through an outlet 18 that is formed by an orifice 26 (shown in FIG. 2) in the downstream housing 12.

Figure 3:
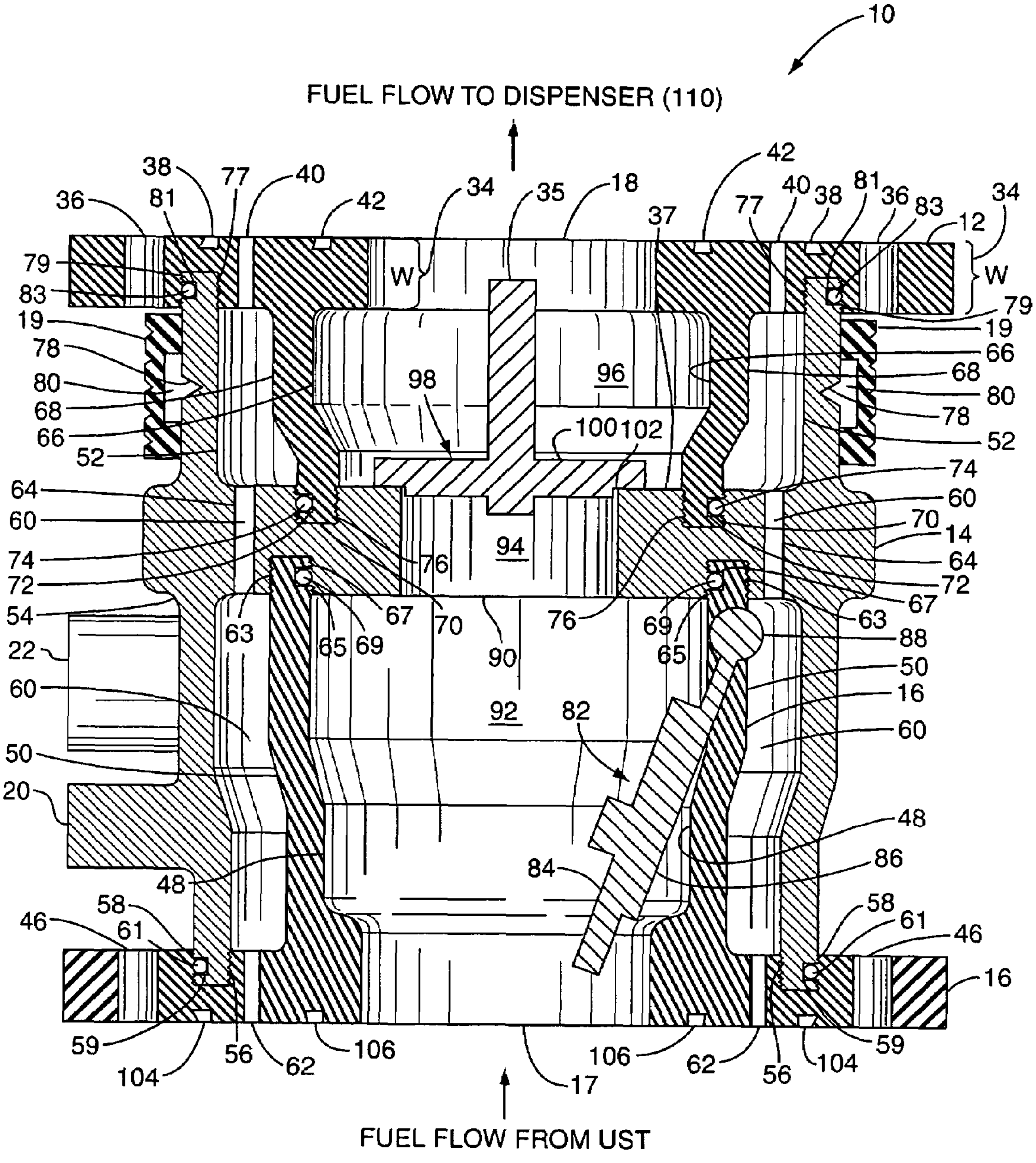
FIG. 3 is a cross section illustration of the shear valve illustrated in FIG. 1.

A leak skirt 19 is provided around a portion of the containment housing 14 so that any fuel that leaks around the shear groove (illustrated in FIG. 3) is prevented from leaking to the environment in the event that the shear valve 10 incurs an impact or other force causing a shearing. Mounting bosses 20, 22 are attached or provided as part of the containment housing 14 to mount the shear valve 10 in place when installed in the field, as is well known to one of ordinary skill in the art. The shear valve 10 may also contain an interstitial space port 277 (illustrated in FIG. 17) that is fluidly coupled to the interstitial space formed between the outer housing 14 and the downstream and upstream housings 12, 16 as illustrated in FIG. 3. This allows a vacuum or pressure-generating source to generate a vacuum or pressure in the interstitial space around the shear valve 10 for monitoring, as described above and in the '504 application, to test the integrity of the housings 12, 14, 16 and the interstitial space around the shear valve 10 for detection of breaches or leaks.

Figure 2:
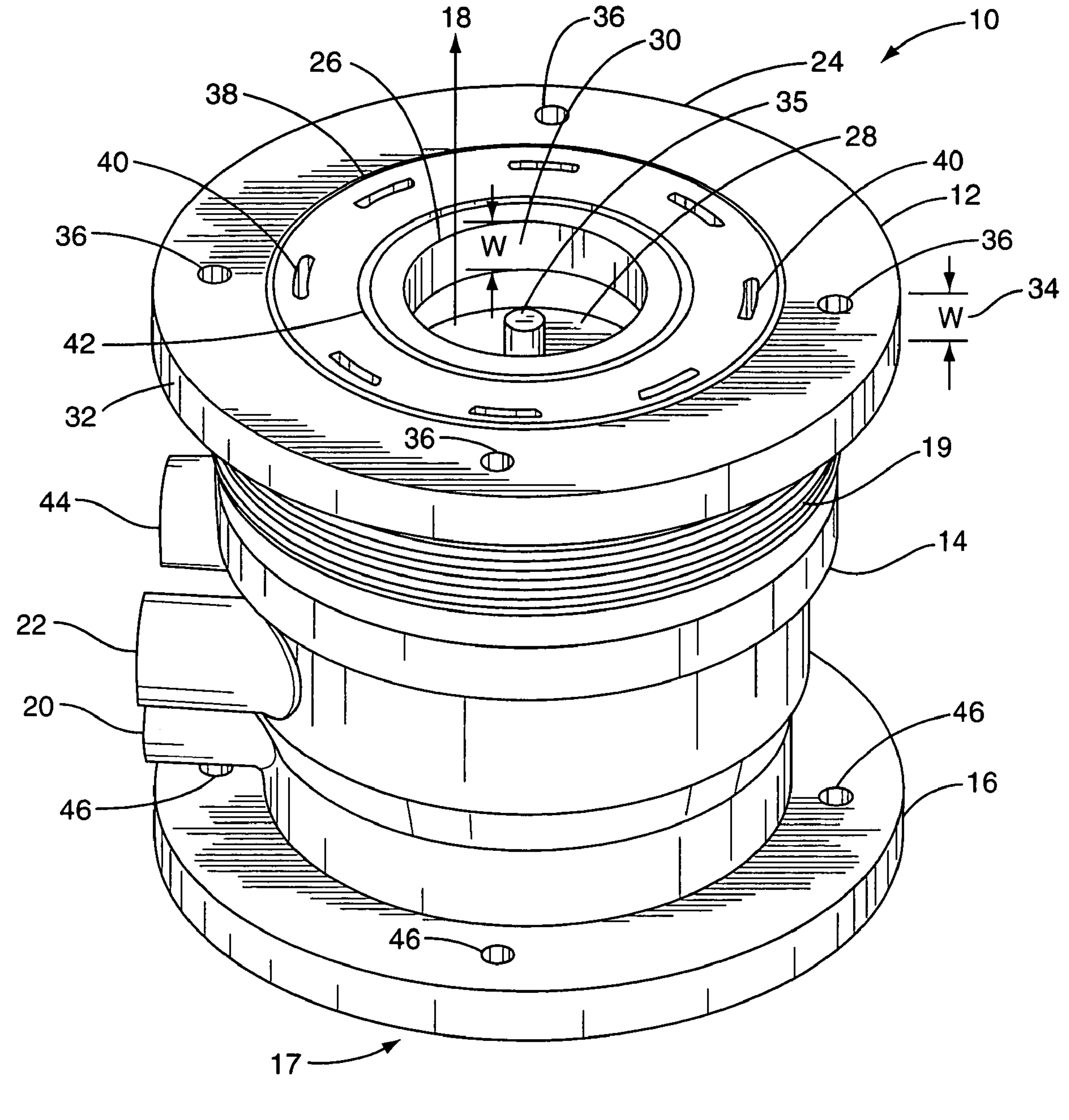
FIG. 2 is an illustration of the shear valve illustrated in FIG. 1 from a top angled view to show the top of the shear valve.

FIG. 2 illustrates the shear valve 10 illustrated in FIG. 1, except that the illustration is from the perspective of a top angle view to show the top of the shear valve 10 and the components and structure of the downstream housing 12. The downstream housing 12 consists of a flange 24 that contains an orifice 26 in approximately the center of the flange 24. The orifice 26 forms a fuel flow path 28 through the downstream housing 12. This fuel flow path 28 is coupled to the fuel flow path that is formed by the upstream housing 16, as will be illustrated more clearly in FIG. 3. The orifice 26 in the flange 24 forms an inner wall 30 that has a thickness shown as 'W', also show as element 34. The flange 24 also contains an outer wall 32 having the same thickness on its outer edge.

FIG. 2 shows a secondary poppet stem 35, that may be spring loaded, that is attached to a secondary poppet valve 98 (illustrated in FIG. 3) that moves downward against a secondary poppet seat 37 (illustrated in FIG. 3) when a shear occurs similar to that disclosed in U.S. Pat. No. 5,244,006, incorporated herein by reference in its entirety. The flange 24 of the downstream housing 12 contains one or more orifices 36 that are used to secure the flange 24 to fuel piping that may be internal to the fuel dispenser (not shown) in a tight manner, using bolts or various other fastening means, so that the fuel flowing through the fuel flow path 28 enters into the fuel piping connected to the flange 24. The flange 24 also contains grooves 38, 42 on the top surface of the flange 24 that are designed to hold an o-ring in place and against a mating fuel piping connection (not shown) so that a tight seal is formed between the outlet 18 of the shear valve 10 and a mated fuel piping.

The flange 24 also contains one or more orifices, called interstitial space orifices 40, that are fluidly coupled to the interstitial space formed between the containment housing 14 and the upstream and downstream housings 12, 16 as will be described in FIG. 3. This is so an interstitial space 60 (illustrated in FIG. 3) of the shear valve 10 can be fluidly coupled to fuel piping that is connected to the flange 24 to form one continuous interstitial space therebetween. In this manner, a leak detection or monitoring system can draw a vacuum or pressurize the interstitial space orifice 40/ interstitial space 60 and monitor the interstitial space 40/60 around the shear valve 10 and fuel piping as one contiguous space.

FIG. 2 also shows a third mounting boss 44, which in combination with mounting bosses 20, 22, allows the shear valve 10 to be physically attached and/or held into place when installed. A support beam or bar (not illustrated) is placed in between mounting bosses 20, 44 and mounting boss 20 so that the mounting bosses 20, 22, 44 surround interior space formed by the mounting bosses 20, 22, 44 to support the shear valve 10. FIG. 2 also shows orifices 46 in the upstream housing 16 that allow the shear valve 10 and its fuel flow path 28 to branch fuel piping located beneath the ground, which, in turn is coupled to the main fuel piping.

FIG. 3 illustrates a cross section illustration of the shear valve 10 illustrated in FIGS. 1 and 2. The upstream housing 16 is comprised of a uniform body that contains an internal orifice forming an upstream housing flow path 92. The thickness of the material comprising the upstream housing 16 provides an inner wall 48 and an outer wall 50. Similarly, the containment housing 14 contains an orifice forming containment housing flow path 94, wherein the thickness of the material comprising the containment housing 14 forms an inner wall 52 and an outer wall 54.

The containment housing 14 is secured to the upstream housing 16 by a threaded male outer edge 56 of the containment housing 14 that is screwed securely into a threaded female groove 58 formed as part of the upstream housing 16. The female threaded groove 58 contains an indentation 59 around its edge whereby an o-ring seal 61 is provided therein to provide sealing between the threaded groove 58 and the threaded outer edge 56 thereby sealing off the downstream housing flow path 96 and the interstitial space 60, between the outer wall 68 and the inner wall 52, from each other. Note that the connections between the outer containment housing 14 and the upstream housing 12 are shown as threaded connections, but may be provided as any other type of connection, including but not limited to a pin connection.

When the upstream housing 16 is secured to the containment housing 14 in this manner, an interstitial space 60 is formed between the outer wall 50 of the upstream housing 16 and the inner wall 52 of the containment housing 14. The upstream housing 16 provides interstitial space orifice 62 that is fluidly coupled to the interstitial space 60 so that piping having an interstitial space that is connected to the upstream housing 16 can fluidly couple its interstitial space with the interstitial space 60 of the shear valve 10 to form one continuous space. Likewise, in order to maintain the fluid coupling of the interstitial space 60 throughout the shear valve 10, the containment housing 14 also contains an interstitial space orifice 62 that couples to interstitial space 60.

Also, the containment housing 14 has a threaded female groove 63, similar to threaded female groove 58 in the upstream housing 16, that mates with a male threaded outer edge 65, to assist in securing the upstream housing 16 to the containment housing 14 just as described above. Again, the threaded outer edge 65 is provided with an indentation 67 to allow an o-ring seal 69 to placed therein to provide a seal just as described above.

The outer surface of the upstream housing 12 also contains grooves 104, 106, similar to grooves 38, 42 on the flange 24 of the downstream housing 12, that are designed to hold o-rings in place and against a mating fuel piping connection (not shown) so that a tight fit is formed between the inlet 17 of the shear valve 10 and a mated fuel piping.

The downstream housing 12 contains an orifice that forms a downstream housing fuel flow path 96 that is fluidly coupled to the outer housing flow path 94 and the upstream housing flow path 92. The downstream housing flow path 96 is only coupled to the outer housing flow path 94 and upstream housing flow path 92 when the poppets 82, 92 are open. Due to the thickness of the material comprising the downstream housing 12, the downstream housing 12 has an inner wall 66 and an outer wall 68.

Just as provided for the connection between the containment housing 14 and the upstream housing 16, the containment housing 14 is also secured to the downstream housing 12 in a similar fashion. The outer containment housing 14 contains a female threaded groove 70 in which a threaded male outer edge 76 of the downstream housing 12 is screwed into to form a tight fit between the outer containment housing 14 and the downstream housing 12. The female threaded groove 70 contains an indentation 72 around its edge whereby an o-ring seal 74 is provided therein to provide a sealed fit between the threaded groove 70 and the threaded outer edge 76 thereby sealing off the downstream housing flow path 96 and the interstitial space 60, between the outer wall 68 and the inner wall 52, from each other. Note that the connections between the outer containment housing 14 and the downstream housing 12 are shown as threaded connections, but may be provided as any other type of connection, including but not limited to a pin connection.

Also, the containment housing 14 has a threaded female groove 77 that mates with a male threaded outer edge 79, to assist in securing the downstream housing 12 to the containment housing 14 just as described above. Again, the threaded outer edge 79 is provided with an indentation 81 to allow an o-ring seal 83 to placed therein to provide a seal just as described above.

The containment housing 14 contains a shear groove 78 on the outer wall 54 to provide a shearing or impact or break point for the shear valve 10 to break or shear in a controlled fashion when impacted. The shear groove 78 extends around the circumference of the containment housing 14. In the event of a shear at the shear groove 78, fuel that may be captured in the interstitial space 60 may leak outside the outer housing 14. Therefore, the leak skirt 19 is provided around the circumference of the shear groove 78 and proximate to the shear groove 78 wherein a leak containment chamber 80 is formed to capture any leaks that may occur as a result of shearing at the shear groove 78. The leak skirt 19 may be manufactured out of any elastic or elastemer material.

The shear valve 10 contains a main poppet 82 comprised of a main poppet head 84 and a carrier 86 similar to the shear valve disclosed in U.S. Pat. No. 5,244,006, previously referenced and incorporated herein. The carrier 86 is connected to a rotatable shaft 88 that is coupled to the upstream housing 16 of the shear valve 10. The rotatable shaft 88 is spring-loaded (not shown) and attached to a fuseable link (not illustrated) contained external to the shear valve 10. When a shearing or other impact occurs on the shear valve 10, the force in the spring is released, causing the main poppet valve 82 to move upward toward a main poppet valve seat 90, wherein the main poppet valve head 84 is pushed securely against the main poppet valve seat 90. This cuts off the upstream housing flow path 92 from containment housing flow path 94 so that fuel cannot leak above the upstream housing flow path 92.

A secondary poppet valve 98 is provided in the downstream housing 12 such that when fuel flows through the upstream housing flow path 92 and through the outer housing flow path 94, the force of the fuel flow presses against a secondary poppet head 100 of the secondary poppet valve 98 to push the secondary poppet head 100 upward. This allows the fuel to flow around and out of the outlet 18. In the event of a shear or other impact to the shear valve 10, the shear valve 10 is designed so that the downstream housing 12 will separate from the containment housing 14. In this event, the secondary poppet stem 35 of the secondary poppet valve 98 is pulled downward due to its bias such that the secondary poppet valve head 100 is pushed securely tight against the secondary poppet valve seat 37. This prevents fuel in fuel piping coupled to the flange 24, outlet 18, and/or and downstream housing flow path 96 from flowing backward into the containment housing flow path 94.

Therefore, as illustrated in FIG. 3, the shear valve 10 provides secondary containment of the fuel flow path formed by the coupling of upstream housing flow path 92 to containment housing flow path 94 to downstream housing flow path 96. If a leak occurs in the upstream or downstream housings 16, 12, the leak will be contained in interstitial space 60 formed between these housings 16, 12 and the containment housing 14. Additionally, via interstitial space orifices 64 and 40, the interstitial space 60 in the shear valve 10 can be coupled to the interstitial space of piping that is connected to the upstream housing 14 and/or the downstream housing 12, so that the interstitial space 60 of the shear valve 10 and the interstitial space of the fuel piping can be fluidly coupled together to monitor the coupled interstitial space 60 as one continuous space.

Figure 4:
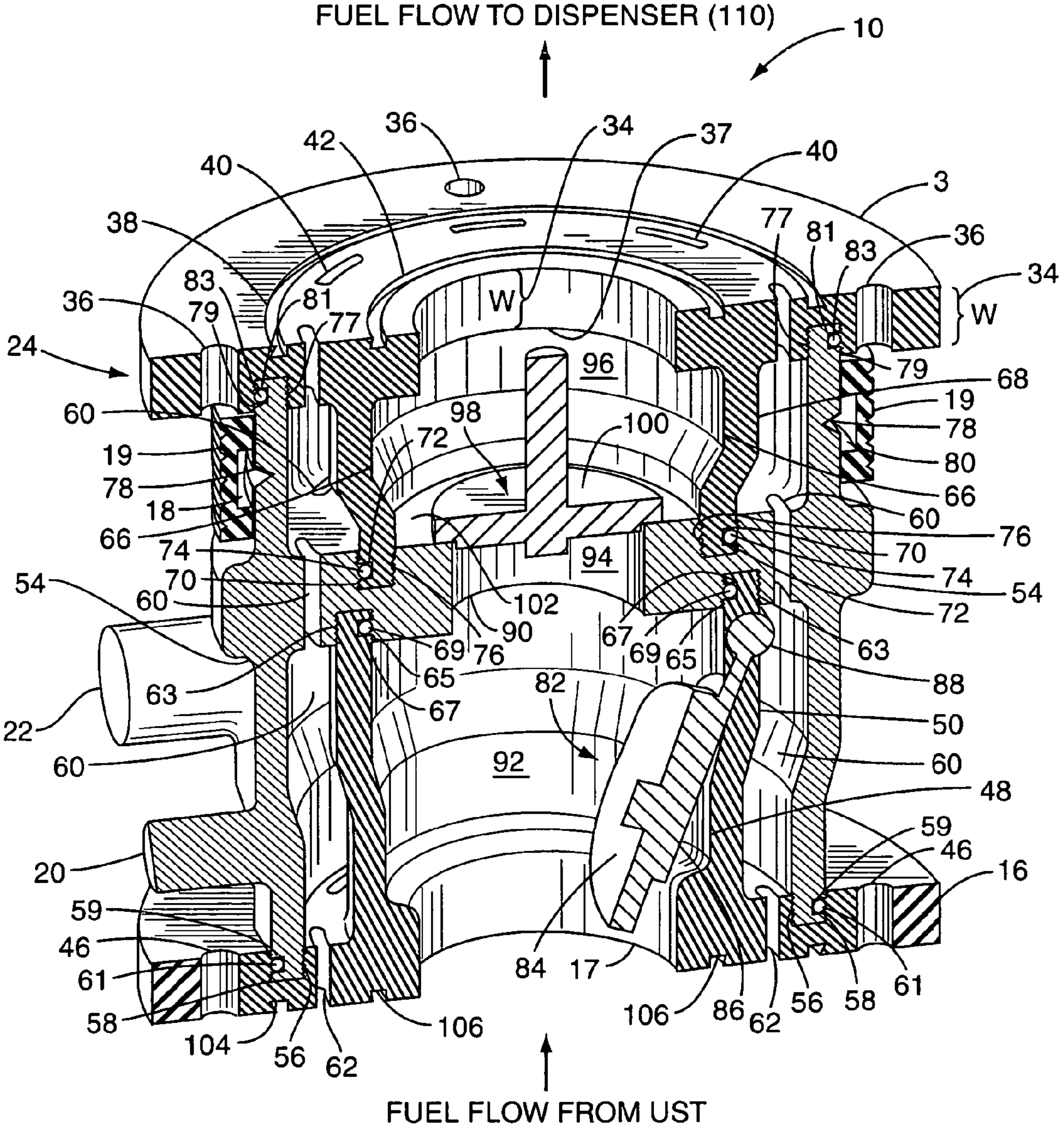
FIG. 4 is an cross section illustration of the shear valve illustrated in FIG. 1 from a top angled view to show the top of the shear valve.

FIG. 4 illustrates the shear valve of FIG. 3 as a cross-section illustration of shear valve 10 from a top angle view perspective. FIG. 4 does not show any additional elements that are not described and illustrated in FIG. 3; however, the drawing provides a depth perception of the interstitial space 60 and how the interstitial space 60 surrounds the outer wall 50 of the upstream housing 16 and the outer wall 68 of the downstream housing 12.

Figure 5:
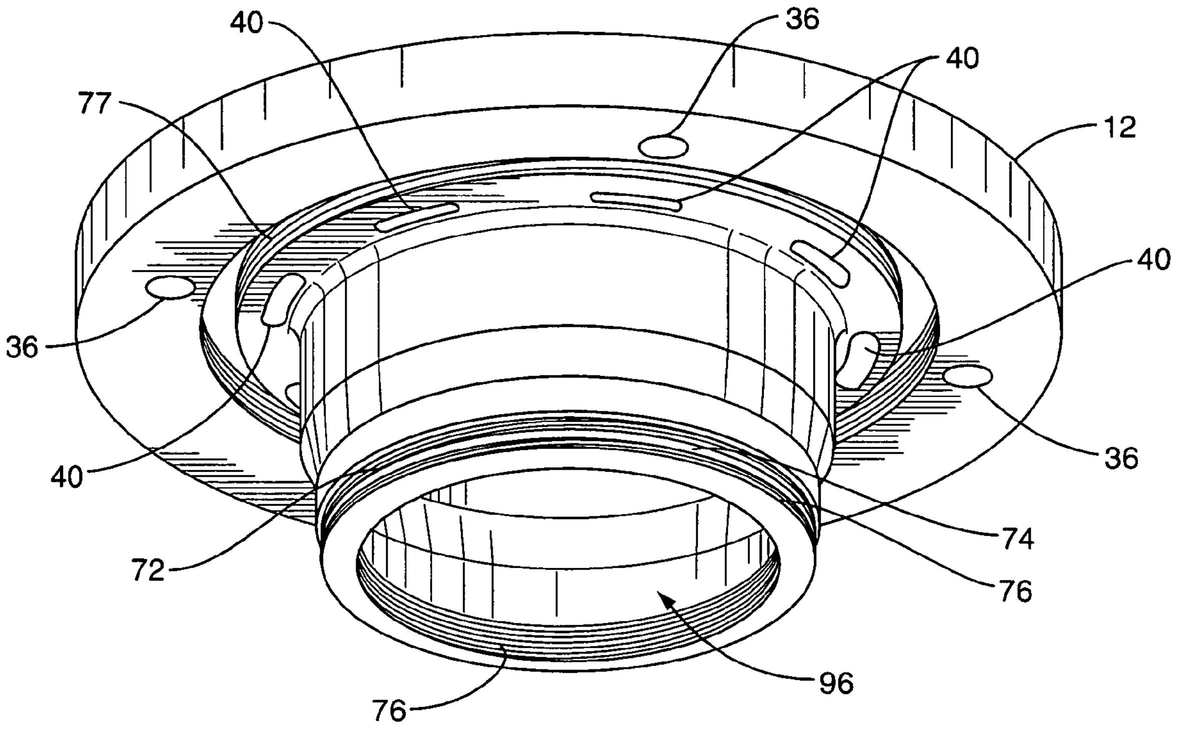
FIG. 5 is a bottom angled view of the downstream housing of the shear valve illustrated in FIGS. 1-4.

FIG. 5 is a bottom angle view of the downstream housing 12 of the shear valve 10 illustrated in the previous figures. Again, all of the elements that form the downstream housing 12 that have been previously illustrated in the preceding figures are shown here and thus are not repeated.

Figure 6:
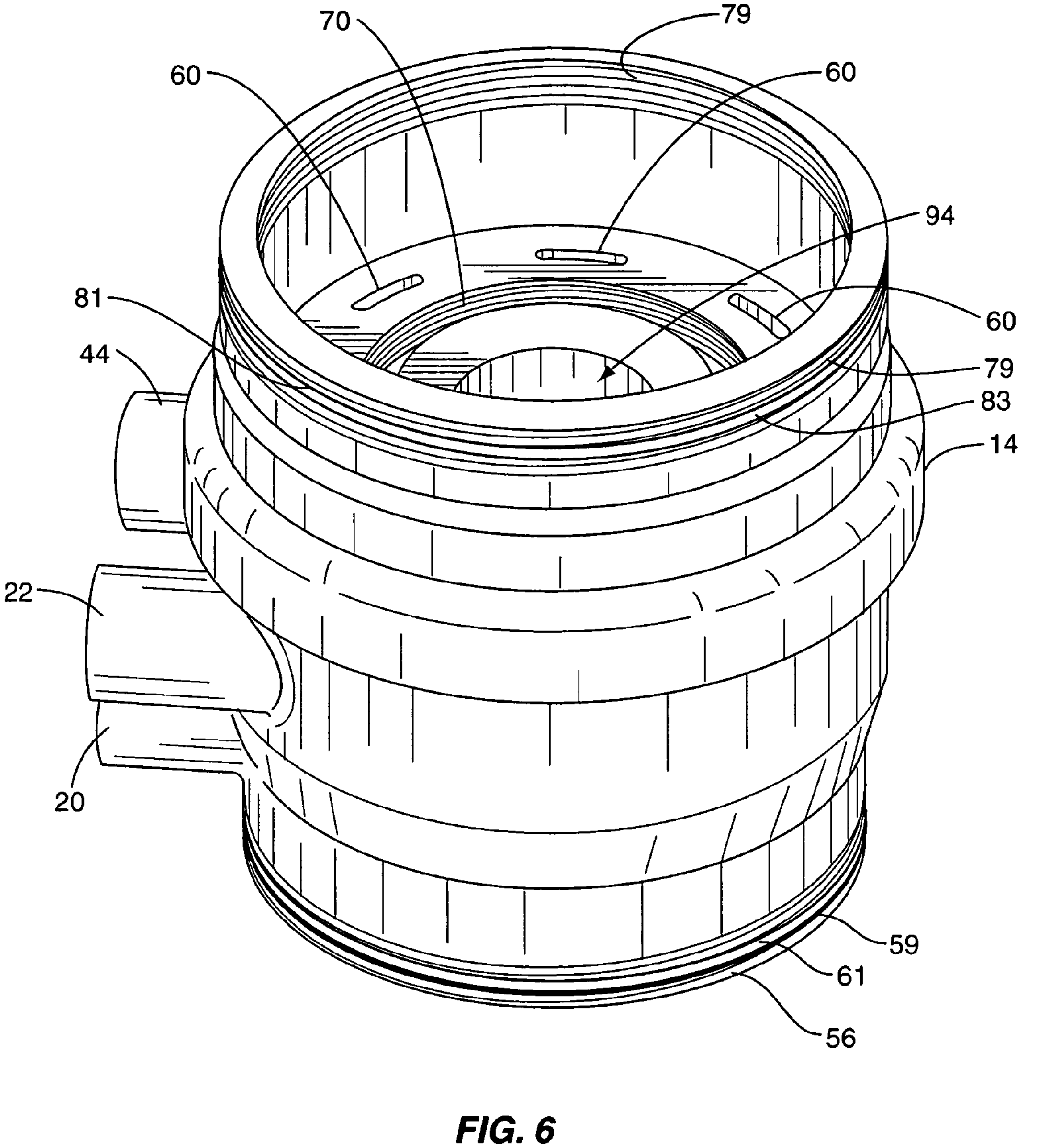
FIG. 6 is an illustration of the containment or outer housing of the shear valve illustrated in FIGS. 1-4.

FIG. 6 illustrates the containment housing 14 of the shear valve 10 from a top angle view perspective to provide an alternative view of the containment housing 14 independent of the upstream housing 16 and downstream housing 12.

Figure 7:
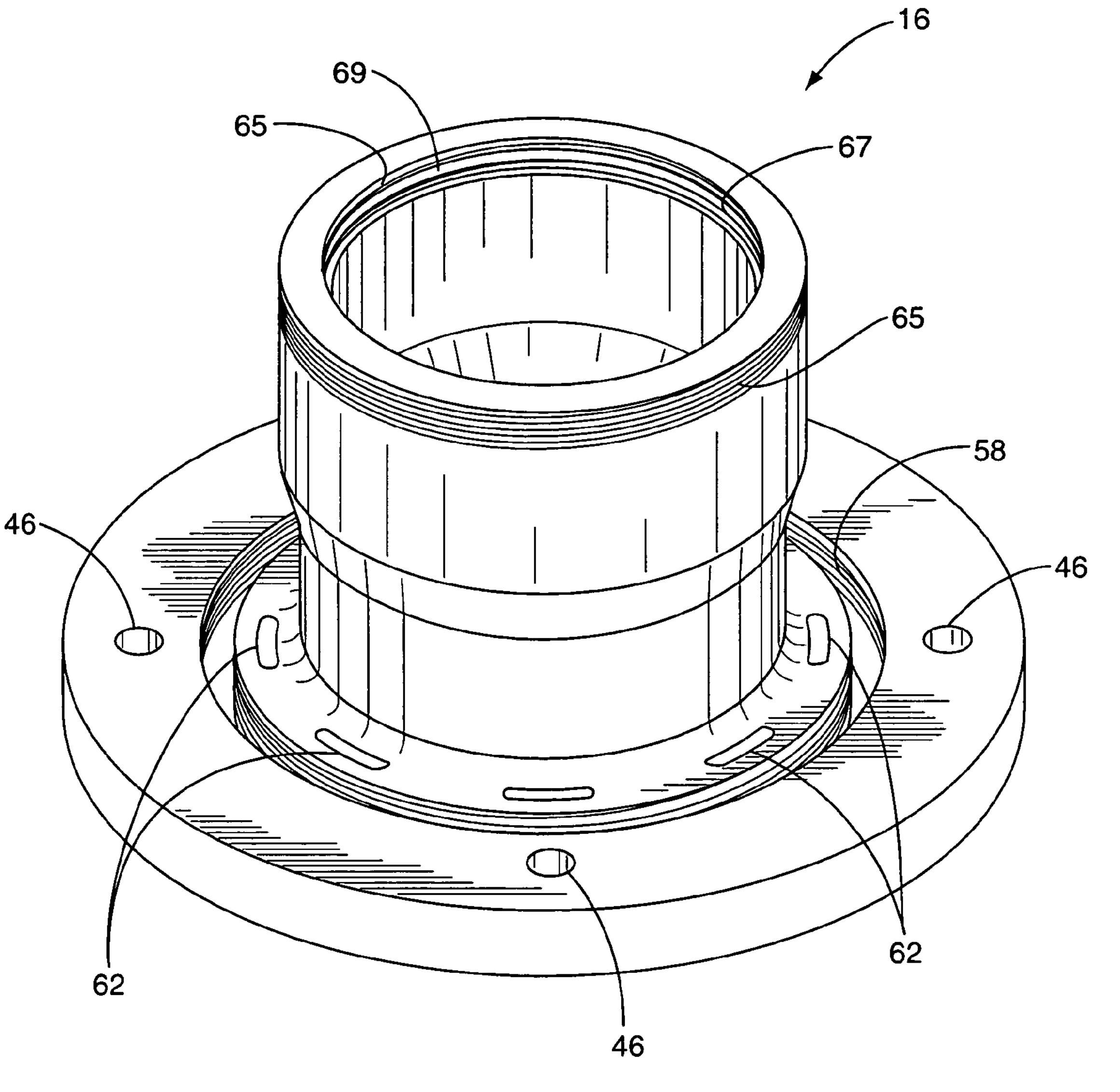
FIG. 7 is a top angled view of the upstream housing of the shear valve illustrated in FIGS. 1-4.

FIG. 7 shows the upstream housing 16 independent of the outer housing 14 and the downstream housing 12, showing aspects that have been previously described in the preceding figures and text.

Figure 8:
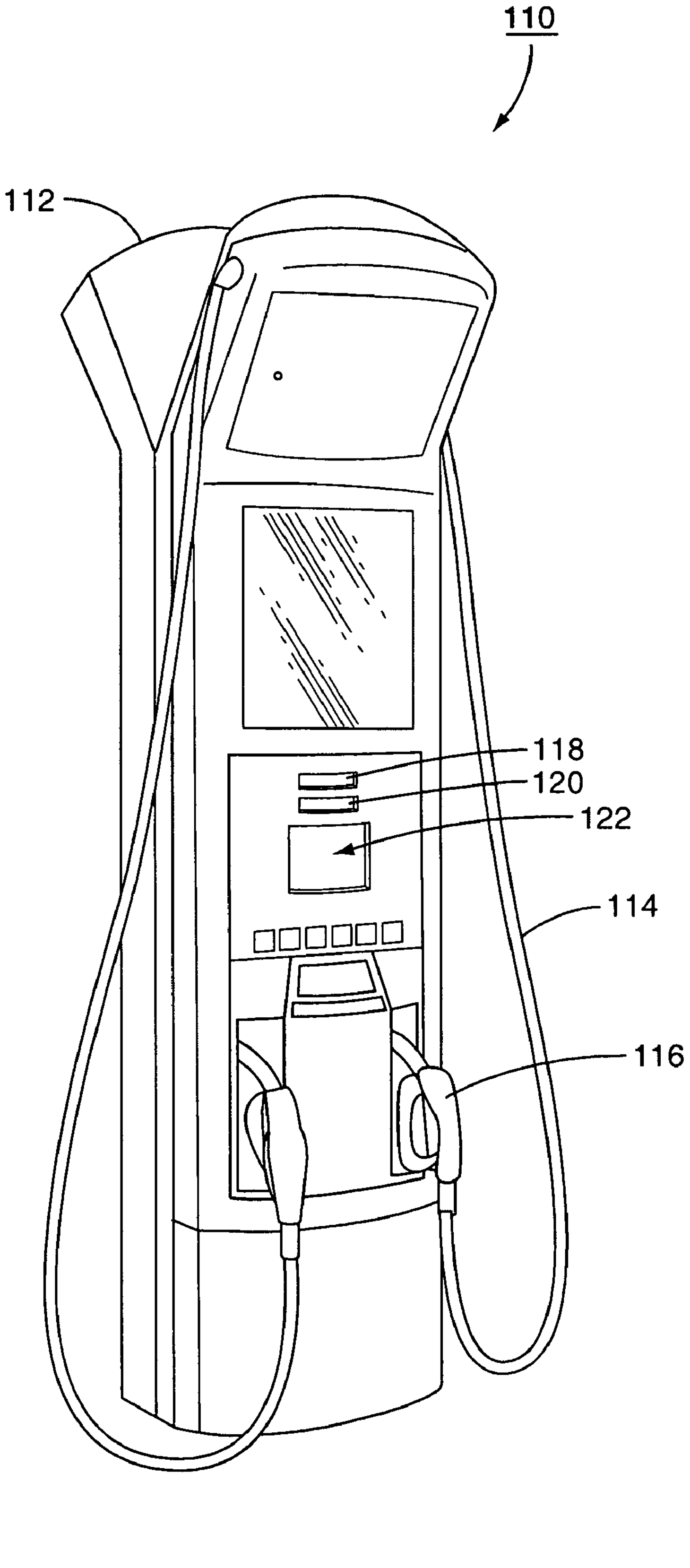
FIG. 8 is an illustration of a fuel dispenser.

FIG. 8 illustrates a fuel dispenser 110 that may be used in conjunction with the shear valve 10 to provide a safety shear valve in the event of an impact to the fuel dispenser 110. The fuel dispenser 110 is being shown as a preferred environmental embodiment and use of the shear valve 10, but the shear valve 10 is not limited to a fuel dispenser application in particular.

The fuel dispenser 110 in FIG. 8 is a typical fuel dispenser that is comprised of a housing 112. A hose 114 and nozzle 116 are provided so that fuel carried internal to the fuel dispenser 110 is dispensed through the hose 114 and through the nozzle 116 into a vehicle fuel tank (not shown). The fuel dispenser 110 contains a price display 118 and a volume display 120, as is typical for a fuel dispenser 110 and is commonly known in the art. The fuel dispenser 110 may also contain an instruction display 122 that provides information and/or instructions to the customer interfacing with the fuel dispenser 110.

Figure 9:
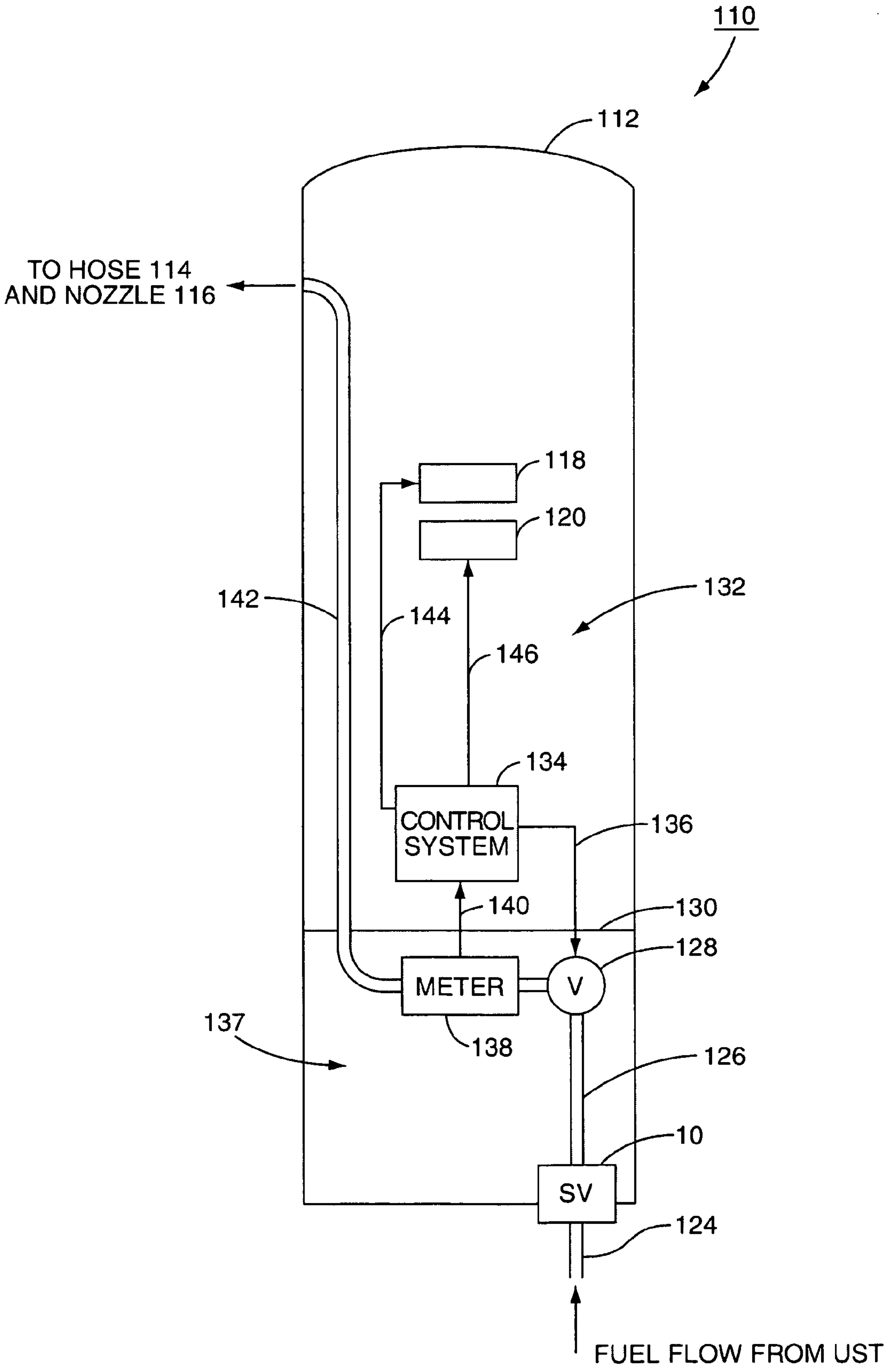
FIG. 9 is an illustration of the fuel dispenser illustrated in FIG. 8 showing the internal components of the fuel dispenser and the interface between the shear valve, the branch fuel piping, and the fuel dispenser internal fuel piping.

FIG. 9 contains an internal view of some of the components that may be contained inside the fuel dispenser 110, and also illustrates how the shear valve 10 may be used with the fuel dispenser 110. As illustrated in FIG. 9, branch fuel piping 124, which is double-walled fuel piping, extends into the inlet 17 of the shear valve 10 as previously described. In this manner, fuel flowing from the UST from the main fuel piping (not shown) that is coupled to the branch fuel piping 124 is connected to the shear valve 10 so that fuel flows through the flow path 92, 94, 96 internal to the shear valve 10.

After the fuel exits the outlet 18 of the shear valve 10, it encounters internal fuel dispenser piping 126 to the fuel dispenser 110 so that the fuel is carried to various components internal to the fuel dispenser 110 for eventual delivery to the hose 114 and nozzle 116 and into a vehicle's fuel tank. Again, the internal fuel dispenser piping 126 may be double-walled piping, such that connection to shear valve 10 provides for the interstitial space of the internal fuel dispenser piping 126 to be coupled to the interstitial space 60 of the shear valve 10, which may be coupled to the interstitial space of the branch fuel piping 124 for the purposes previously described.

After the fuel enters into the internal fuel piping 126, it may encounter a flow control valve 128 and meter 138. The valve 128 is under the control of the control system 134 via a valve control signal line 136. In this manner, the control system 134 can control the opening and closing of flow control valve 128 to either allow fuel to flow or not flow through the meter 138 and on to the hose 114 and nozzle 116. The control system 134 typically instructs the flow control valve 128 to open when a fueling transaction is proper and allowed to be initiated.

The flow control valve 128 is contained below a vapor barrier 130 in a hydraulics area 131 of the fuel dispenser 110 where Class 1, Division 1 components are provided for safety reasons and in an intrinsically safe manner, as described in U.S. Pat. No. 5,717,564, incorporated herein by reference in its entirety. Control system 134 is typically located in a compartment of the fuel dispenser 110 above the vapor barrier 130 that does not have to be provided in an intrinsically safe housing. After the fuel exits the flow control valve 128, the fuel typically encounters a meter 138 wherein the fuel flow though the meter 138, and the meter 138 measures the volume and/or flow rate of the fuel. The meter 138 typically contains a pulser (not shown) that generates a pulser signal 140 to the control system 134, indicative of the volume and/or flow rate of fuel. In this manner, the control system 134 can update the price display 118 and the volume display 120, via the price display signal line 144 and the volume display signal line 146, so that the customer is informed of the price to be paid for the fuel as well as the volume of fuel dispensed.

After the fuel exits the meter 138, the fuel is carried in more internal fuel flow piping 142, which is then coupled to a hose 114 typically located in the upper housing or canopy of the fuel dispenser 110 and on to the nozzle 116, as is well known to one of ordinary skill in the art.

In this manner, by the shear valve 10 having the interstitial space 60, as described above, leaks or breaches in the housings 12, 16 of the shear valve 10 are contained in the interstitial space 60 formed by the containment housing 14. Further, the interstitial space orifices 40, 62 being coupled to the interstitial space 60 of the shear valve 10, allows coupling of the interstitial space 60 to the interstitial space of the branch fuel piping 124, so that the interstitial space of the internal fuel dispenser piping 126 can be coupled to the interstitial space of the branch fuel piping 124, through the shear valve interstitial space 60. This provides one continuous interstitial space between the interstitial spaces of the branch fuel piping 124, the shear valve 10, and the internal fuel dispenser piping 126 so that the continuous space can be monitored as one space for leak prevention and/or detection.

Figure 10:
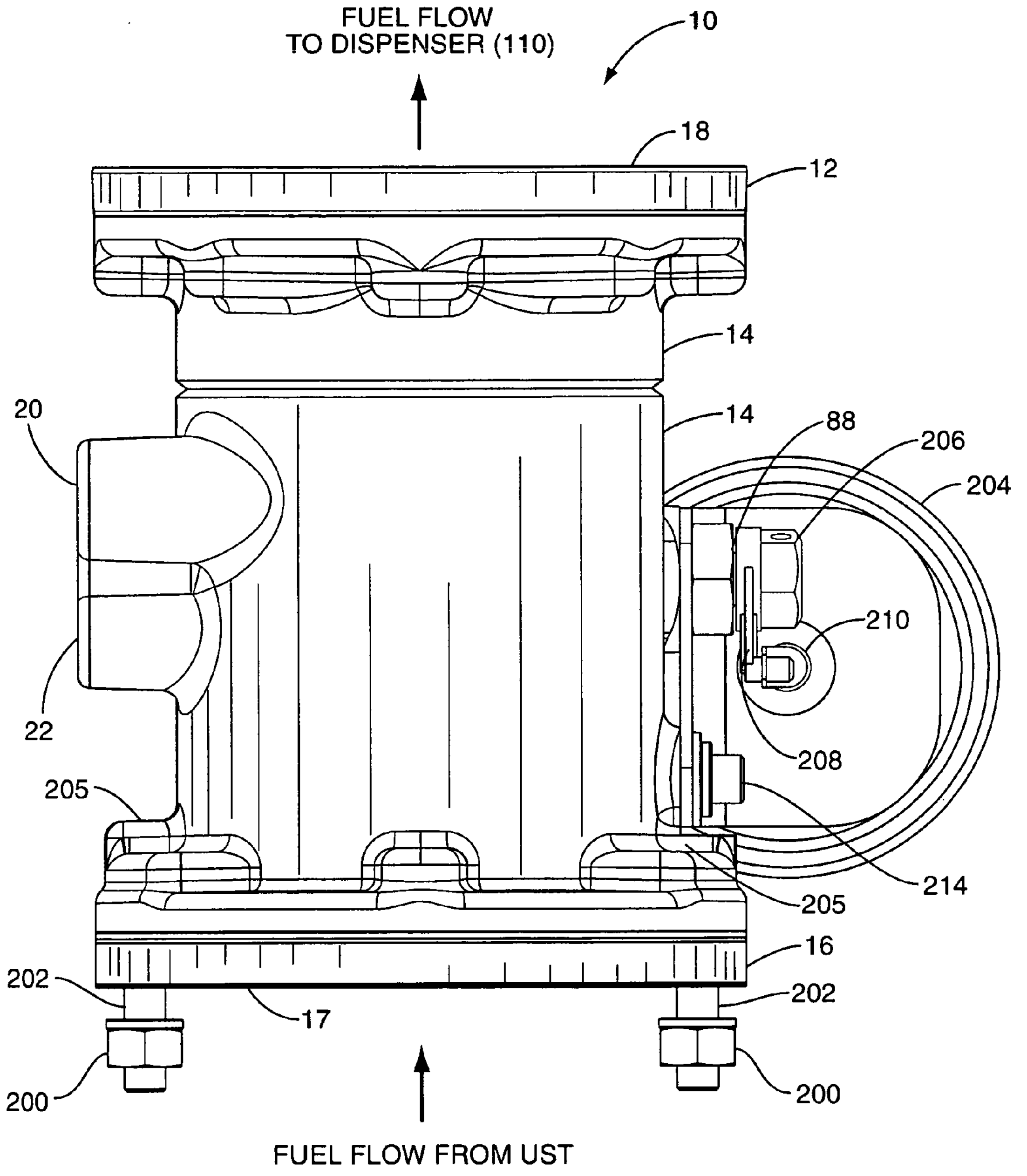
FIG. 10 is an illustration of a second embodiment of the double-walled contained shear valve.

FIG. 10 illustrates an alternative embodiment of the double-walled contained shear valve 10. The double-walled shear valve 10 in FIG. 10 is illustrated from a front view. Similar to the shear valve 10 illustrated in FIGS. 1-9, the double-walled shear valve 10 in FIG. 10 is comprised of a downstream housing 12 coupled to the outer housing or containment housing 14. The containment housing 14 is coupled to the upstream housing 16. An orifice (not shown in FIG. 10) in the upstream housing 16 provides an inlet 17 to receive fuel from a branch or main fuel piping carrying fuel from a storage tank. The fuel is carried through an internal fuel flow path of the double-walled shear valve 10. The fuel exits the shear valve 10 through an outlet 18 formed by the orifice 26 (shown in FIGS. 12 and 14) within the downstream housing 12. The mounting bosses 20, 22 are attached or provided as part of the containment housing 14 to mount the double-walled shear valve 10 in place when installed in the field.

Figure 11:
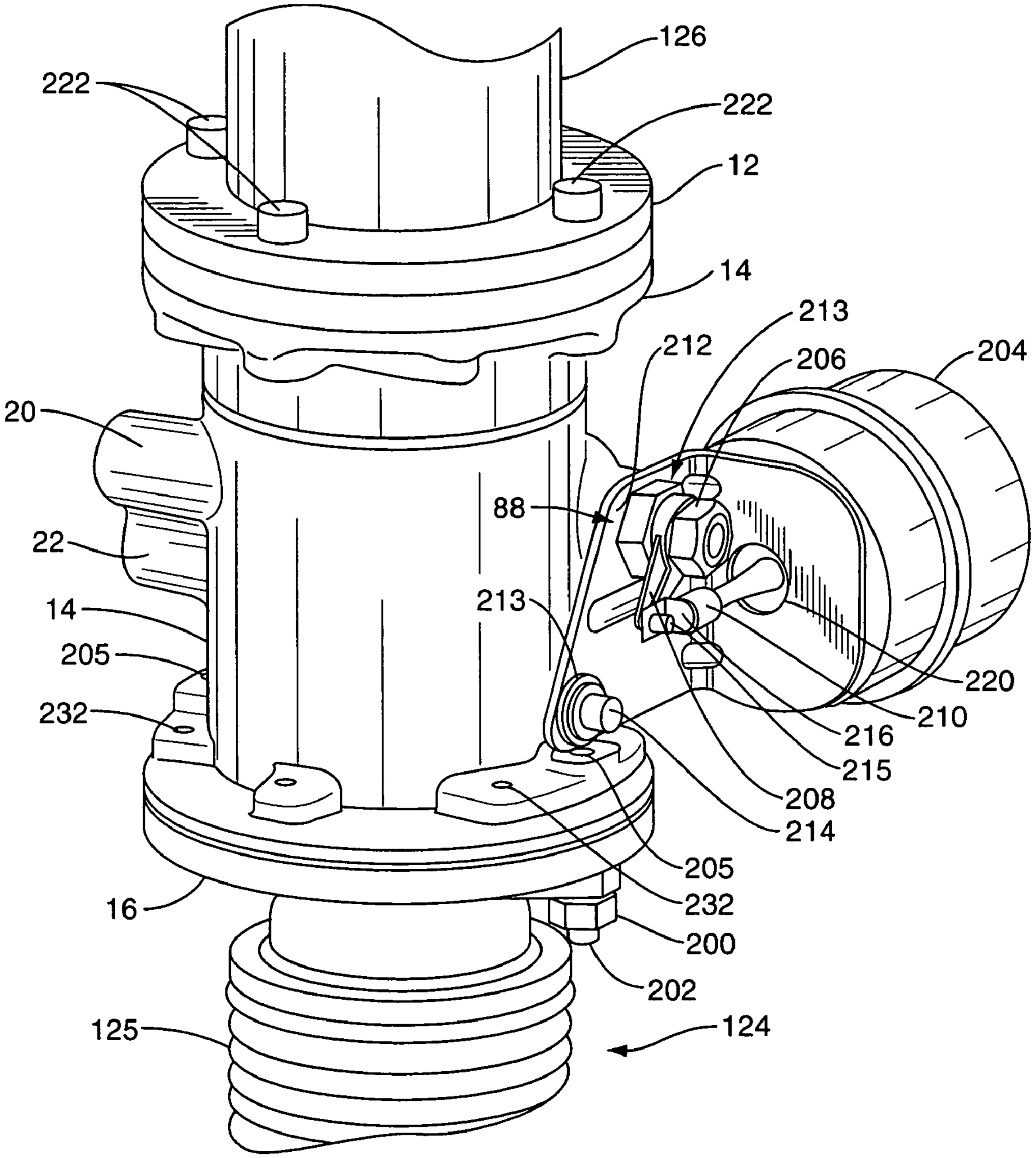
FIG. 11 is an illustration of the shear valve illustrated in FIG. 10 attached to fuel piping.

As illustrated in FIG. 10 and more particularly in FIG. 11, the shear valve 10 may be fitted with a vacuum actuator 204. The vacuum actuator 204 is coupled to the interstitial space 60 (illustrated in FIG. 12) of the shear valve 10. The vacuum actuator 204 is designed to apply a rotational force to the rotatable shaft 88 to open and close the main poppet valve 82 in response to generation or loss of a vacuum level in the interstitial space 60 within the shear valve 10 or other system having a separate interstitial space (not shown). This separate interstitial space may be internal fuel dispenser piping 126, branch fuel piping 124, main fuel piping (not shown), a containment sump (not shown) or any other fuel-handling component where a loss of vacuum is indicative of a possible leak. The vacuum actuator 204 is comprised of an internal vacuum actuation device (not shown) that retracts a vacuum actuator shaft 210 from a vacuum actuator orifice 220 in response to generation of a sufficient vacuum level. The vacuum actuator 204 is attached to the containment housing 14 of the shear valve 10 via a vacuum actuator mounting plate 212. The vacuum actuator mounting plate 212 contains two mounting orifices 213. A mounting bolt 214 is placed inside one mounting orifice 213 to secure the plate 212 to the containment housing 14. The rotatable shaft 88 that protrudes the containment housing 14 fits inside the other orifice 213 and is secured using another bolt 216.

The vacuum actuator shaft 210 is coupled to an attachment means 216 that is attached to a lever 208 attached to the rotatable shaft 88. The rotatable shaft 88 is spring biased in a clockwise rotational direction. When a sufficient vacuum level is generated, the vacuum actuator 204 pulls the vacuum actuator shaft 210 inward thereby causing the rotatable shaft 88 to rotate counter-clockwise. This opens the main poppet valve 82 inside the fuel flow path within the shear valve 10 to allow fuel flow. When the vacuum level is sufficiently lost in the interstitial space 60, the vacuum actuator 204 moves the vacuum actuator shaft 210 outward thereby releasing the energy in the spring biased rotatable shaft 88 causing it to rotate clockwise. This closes the main poppet valve 82 inside the fuel flow path of the shear valve 10 thereby cutting off fuel flow. This is because loss of vacuum level in the interstitial space 60 in the shear valve 10 is indicative of a leak in either the upstream housing 16, the downstream housing 12, or the containment housing 14, which may be due to a shear. Or as discussed above, the loss of vacuum may be in another system where it is desired to close the shear valve 10 in response for safety reasons. It is desired to automatically close the main poppet valve 82 to close the fuel flow path in the shear valve 10 when a leak is detected in the form of a vacuum level loss.

The double-walled shear valve 10 illustrated in FIG. 11 is attached to the branch fuel piping 124, as well as the internal fuel dispenser piping 126. The branch fuel piping 124 may include a flex connection piping portion 125 to allow flexibility when attaching the piping 125 to the double-walled shear valve 10 in the field. Fuel flow from the storage tank (not shown) travels through fuel piping eventually reaching the branch fuel piping 124. From there, the fuel enters into the double-walled shear valve 10 and exits through the downstream housing 12 and into a fuel flow path internal to the fuel dispenser piping 126 when the main poppet valve 82 and the secondary poppet valve 98 are open. The dispenser fuel piping 126 is attached to the downstream housing 12 of the double-walled shear valve 10 via fasteners 222. The branch fuel piping 124 is attached to the upstream housing 16 of the shear valve 10 via fasteners 200 that are fitted into orifices 205 and secured tightly via bolts 202 (see FIG. 10 as well).

Figure 12:
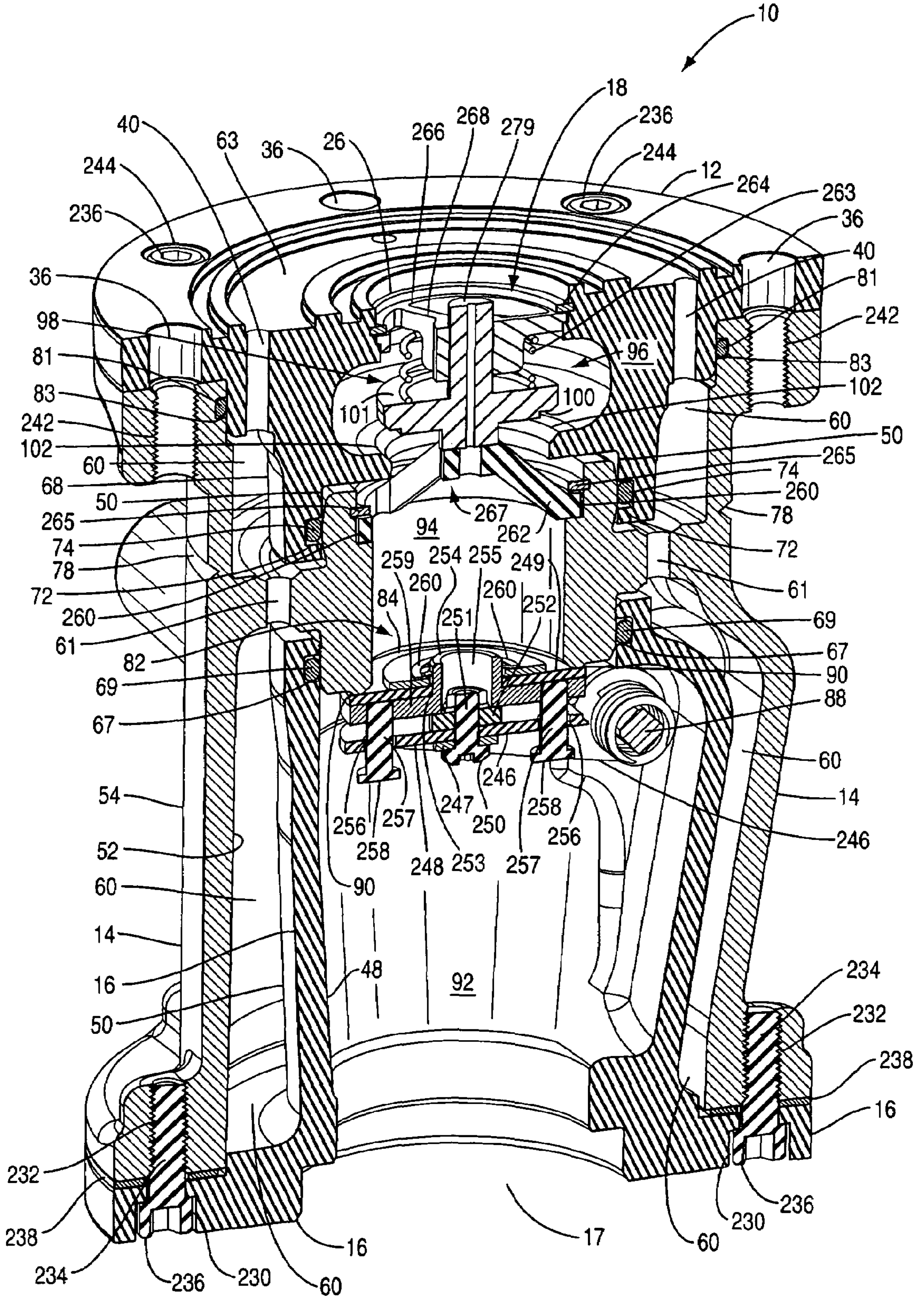
FIG. 12 is a cross section illustration of the shear valve illustrated in FIG. 10 with the main poppet valve closed to disallow fuel flow in response to a shear or loss of vacuum.

FIG. 12 illustrates a cross-sectional view of the double-walled shear valve 10 as illustrated in FIG. 10. The upstream housing 16 is comprised of a uniform body that contains an internal orifice forming an upstream housing flow path 92. The thickness of the material comprising the upstream housing 16 provides an inner wall 48 and an outer wall 50. Similarly, the outer or containment housing 14 contains an orifice forming a containment housing flow path 94, wherein the thickness of the containment housing 14 forms an inner wall 52 and an outer wall 54.

The containment housing 14 is secured to the upstream housing 16 by a threaded orifice 232 and fastener 234 fitted into a slot 230 in the upstream housing 16 for a flush mount attachment. The fastener 234 is threaded and contains a fastener head 236 for fastenably rotating the fastener 234 into the threaded orifice 232. An o-ring seal 238 is provided around the threaded orifice 232 to provide a tight seal between the upstream housing 16 and the containment housing 14 when securely attached to each other.

When the upstream housing 16 is attached to the containment housing 14, an indention or notch 67 in the inner wall 48 of the upstream housing 16 rests against the containment housing 14. The notch 67 is located around the circumference of the inner wall 48 of the upstream housing 16. An o-ring seal 69 is placed inside the notch 67 to provide a tight seal between the top of the upstream housing 16 where the inner wall 48 of the upstream housing 16 abuts against the containment housing 14.

Similarly, the downstream housing 12 is securely attached to the containment housing 14 via a fastener orifice 242 provided in the containment housing 14. A fastener 290 (illustrated in FIG. 18) is placed inside the orifice 36 in the downstream housing 12 aligned with the fastener orifice 242. The fastener 290 is threaded and is screwed into the fastener orifice 242 to securely attach the downstream housing 12 to the containment housing 14. Similar to notch 67, the containment housing 14 contains an indention or notch 81 located around the circumference of the containment housing 14 where the inner wall 52 of the containment housing 14 abuts the downstream housing 12. An o-ring seal 83 is placed inside the notch 81 to provide a tight seal.

The downstream housing 12 also has an indention or notch 72 located around the circumference of the inner wall of the downstream housing 12. An o-ring seal 74 is placed inside the notch 72 to provide a tight seal between the inner wall of the downstream housing 12 and the outer wall 50 of the containment housing 14.

When the upstream housing 16 and the downstream housing 12 are secured to the containment housing 14 in this manner, an interstitial space 60 is formed between the outer wall 50 of the upstream housing 16 and the inner wall 52 of the containment housing 14. The containment housing 14 provides an interstitial space orifice 61 that is fluidly coupled to the interstitial space 60 formed between the inner wall 52 of the containment housing 14 and the outer wall 68 of the downstream housing 12. In this manner, one contiguous interstitial space 60 surrounds the outer wall 50 of the upstream housing 16 and the outer wall 68 of the downstream housing 12 (i.e. the fuel flow paths 92, 94, 96) to contain leaks and/or to allow vacuum or pressure level monitoring of the interstitial space 60.

The containment housing 14 also contains the shear groove 78 along the circumference of the outer wall 54 to provide a shearing point for the double-walled shear valve 10 to break or shear in a controlled fashion when impacted. In the event of a shear at the shear groove 78, fuel captured inside the interstitial space 60 may leak outside the containment housing 14 through the shear groove 78. Therefore, although not illustrated in FIG. 12, the leak skirt 19 like that illustrated in the double-walled shear valve 10 of FIG. 3 may be provided although not required.

The downstream housing 12 contains an orifice that forms a downstream housing fuel flow path 96. The downstream housing fuel flow path 96 is fluidly coupled to the containment housing flow path 94 and the upstream housing flow path 92 when the main poppet valve 82 and the secondary poppet valve 98 are open. The fuel flow paths 92, 94, 96 form one flow path to allow fuel to flow from the branch fuel piping 124 through the shear valve 10 and out to the internal fuel dispenser piping 126 during normal operation.

The double-walled shear valve 10 contains the main poppet valve 82 that controls opening and closing of the upstream housing flow path 92 to the containment housing flow path 94 to allow fuel to flow therethrough. The main poppet valve 82 is comprised of a main poppet valve head 84 that rests against a main poppet valve seat 90 formed around the orifice in the containment housing 14 forming the containment housing fuel flow path 94. When the main poppet valve 82 is closed, fuel flow is prevented from flowing from the upstream housing fuel flow path 92 to the containment housing fuel flow path 94.

One aspect of the invention and the shear valve 10 illustrated in FIG. 12 provides an improved main poppet valve 82 that requires less force to open. This is particularly important when using a vacuum actuator 204 to automatically apply a rotational force to the rotatable shaft 88 to open the main poppet valve 82 when a sufficient vacuum level is restored in the interstitial space 60. A vacuum actuator 204 may not be able to generate enough rotational force to rotate the rotatable shaft 88 when a large pressure differential exists across the main poppet valve 82. Or, using the vacuum actuator 204 with greater force ranges may be too expensive for practical inclusion in the shear valve 10.

For example, if there is pump pressure trapped in the upstream stream housing fuel flow path 92 and little or no pressure or atmospheric pressure in the containment housing fuel flow path 94, a large force is required open the main poppet valve 82. It would not be uncommon for a 50 p.s.i. pressure drop to be present across the main poppet valve 82. Depending on the diameters, areas of the main poppet valve head 84 could have anywhere from 1.7 to two times 50 psi of force required to move the main poppet valve head 84 away from the main poppet valve seat 90 to thereby opening the main poppet valve 82.

In order to provide a main poppet valve 82 that can be opened with less force, so that a sufficient and/or less expense vacuum actuator 204 may be used to open the main poppet valve 82, the main poppet valve 82 includes a main poppet valve head 84 that is attached to a main poppet valve support 259. The main poppet valve support 259 contains a main poppet valve support orifice 253 formed by an inner diameter tube 254 formed as part of the same component. The inner diameter tube 254 has an inner diameter orifice 255 coupled to the containment housing fuel flow path 94. The inner diameter seal 252 seals off an inner diameter orifice 255 from the upstream housing fuel flow path 92. The main poppet valve head 84 is attached around the circumference of the inner diameter tube 254 via a retaining ring 260. The inner diameter seal 252 rests against, but is unconnected, to the main poppet valve support 259 and is attached to a flapper 246 via a washer 247 and attachment means 250. When the inner diameter seal 252 is cracked, the pressure differential between the containment housing fuel flow path 94 and the upstream housing fuel flow path 92 starts to equalize. Thereafter, it is easier and requires less force to lift the main poppet valve head 84 off of the main poppet valve seat 90 to open the main poppet valve 82.

A flapper 246 is attached to the rotatable shaft 88. The flapper 246 is comprised of a flapper ledge 248 containing two flapper orifices 256 that surround two main poppet valve shafts 257 mounted perpendicularly to the main poppet valve support 259. When the flapper 246 rotates in a counter-clockwise direction, via the vacuum actuator 204 rotating the rotatable shaft 88 in a counter-clockwise direction, the flapper 246 and its flapper orifices 256 move down about the main poppet valve shafts 257. This cause the inner diameter seal 252 to open first, lifting down off of the main poppet support 259 and opening the main poppet support orifice 253. This couples the inner diameter orifice 255 to the upstream housing fuel flow path 92 to begin to equalize any pressure differential between the containment housing fuel flow path 94 and the upstream housing fuel flow path 92. Less force is required to overcome the pressure differential between the inner diameter orifice 255 and the upstream housing fuel flow path 92 than would otherwise be required to overcome the pressure differential between the containment housing fuel flow path 94 and the upstream fuel flow path 92.

Thus, providing the inner diameter orifice 255 reduce this pressure differential and allows a less powerful vacuum actuator 204 to open the inner diameter seal 252. Thereafter, the flapper 246 continues to rotate counter-clockwise until the flapper ledge 248 rests against protruding portions 258 of the main poppet valve shafts 259. Once this occurs, the main poppet valve shaft 257 pulls against the main poppet valve support 90 thereby pulling the main poppet valve head 84 away from the main poppet valve seat 90 to open the main poppet valve 82. Opening the main poppet valve 82 couples the upstream fuel flow path 92 to the containment housing fuel flow path 94 to allow fuel to flow through the shear valve 10.

Figure 13:
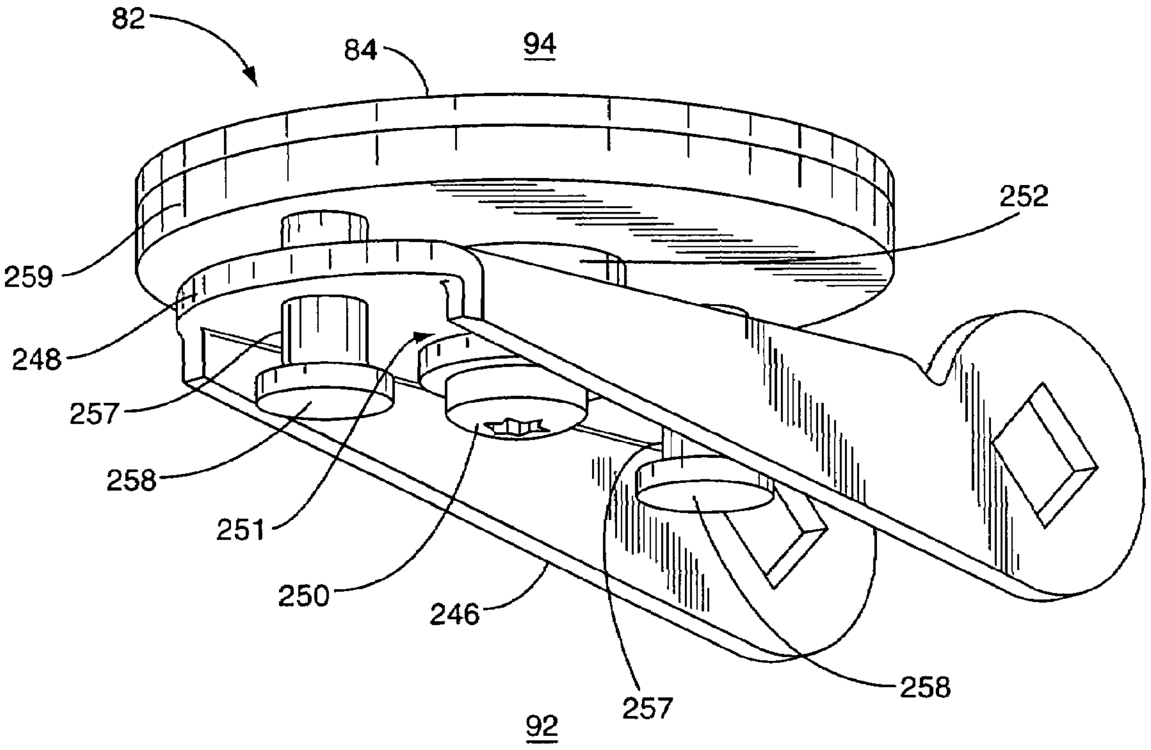
FIG. 13 is an illustration of the vacuum actuator linkage mechanism to open and close the main poppet valve of the shear valve illustrated in FIG. 10.
Figure 14:
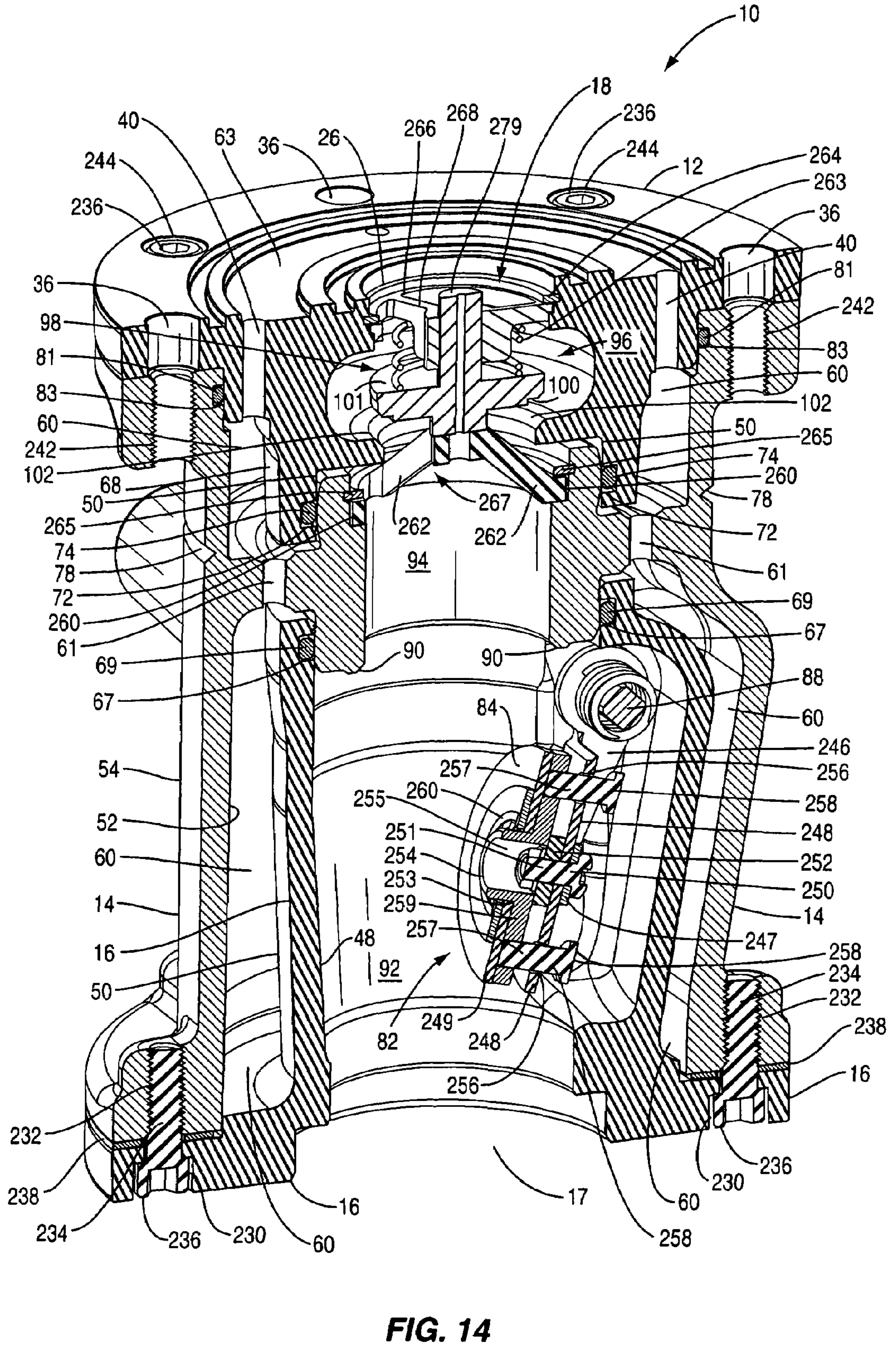
FIG. 14 is a cross section illustration of the shear valve illustrated in FIG. 10 with the main poppet valve open to allow fuel flow.

FIG. 13 illustrates the flapper 246 in larger detail. As shown, the flapper ledge 248 will eventually contact and push downward on the main poppet valve shaft protrusions 258 after the inner diameter seal 252 is opened. Because the inner diameter seal 252 has opened thereby opening the main poppet valve support orifice 253 and coupling the containment fuel flow path 94 to the upstream fuel flow path 92, less force is required to be applied by the flapper ledge 248 to pull down on the main poppet valve support 259 thereby pulling the main poppet valve seat 84 from the main poppet valve seat 90 to open the main poppet valve 82. FIG. 14 illustrates the main poppet valve 82 fully opened.

Turning back to FIG. 12, after the fuel reaches the containment housing fuel flow path 94 due to the main poppet valve 82 being opened, the fuel flow next encounters a conical rib support 262 that contains orifices 267 there around to allow fuel flow to pass therethrough. The conical rib support 262 props open the secondary poppet valve 98 to allow fuel flow to pass therethrough and into the downstream fuel flow path 96 for eventual exit out of the orifice 18 of the double-walled shear valve 10. The conical rib support 262 is supported by the containment housing 14. The legs of the conical rib support 263 rest and are contained inside the indention or notch 260 that is located around the circumference of the containment housing 14 in the containment housing fuel flow path 94. A retaining ring 265 holds the conical rib support 262 in place.

The secondary poppet valve 98 contains a secondary poppet support 101 having a perpendicular shaft member 279 that rests against a spring 263. The spring 263 rests between the secondary poppet support 101 and a stop or upstream housing retaining member 266 comprised of ribs 268 providing orifices to allow fuel to flow there through. The stop 266 is held in place via indention or notch 264 that is contained along the circumference of the downstream housing 12 in the downstream housing fuel flow path 96. The shaft member 279 protrudes through and moves along a center orifice within the retaining member 266. The secondary poppet head 100 is designed to rest against the secondary poppet seat 102 when the secondary poppet valve 98 is closed. The conical rib support 262 pushes upward against the secondary poppet valve 98 to extend its shaft 264 upward to keep the secondary poppet valve 98 open and from resting against the secondary poppet valve seat 102, thereby coupling the containment housing fuel flow path 94 to the upstream housing fuel flow path 96. The conical rib support 262 will remain with the containment housing 14 in either a damaged or undamaged state in the event of a complete shear or separation of the downstream housing 12 from the containment housing 14. In either event, such separation will cause the secondary poppet valve 98 to be pushed downward to rest against the secondary poppet valve seat 102 to close the secondary poppet valve 98. In this manner, fuel resident in the downstream housing fuel flow path 96 or in the fuel dispenser piping 126 coupled to the shear valve 10 will not flow back past the secondary poppet valve 98, and thus possibly leak through the damaged shear valve 10 or shear groove 78 when a shear or other impact occurs.

Figure 15:
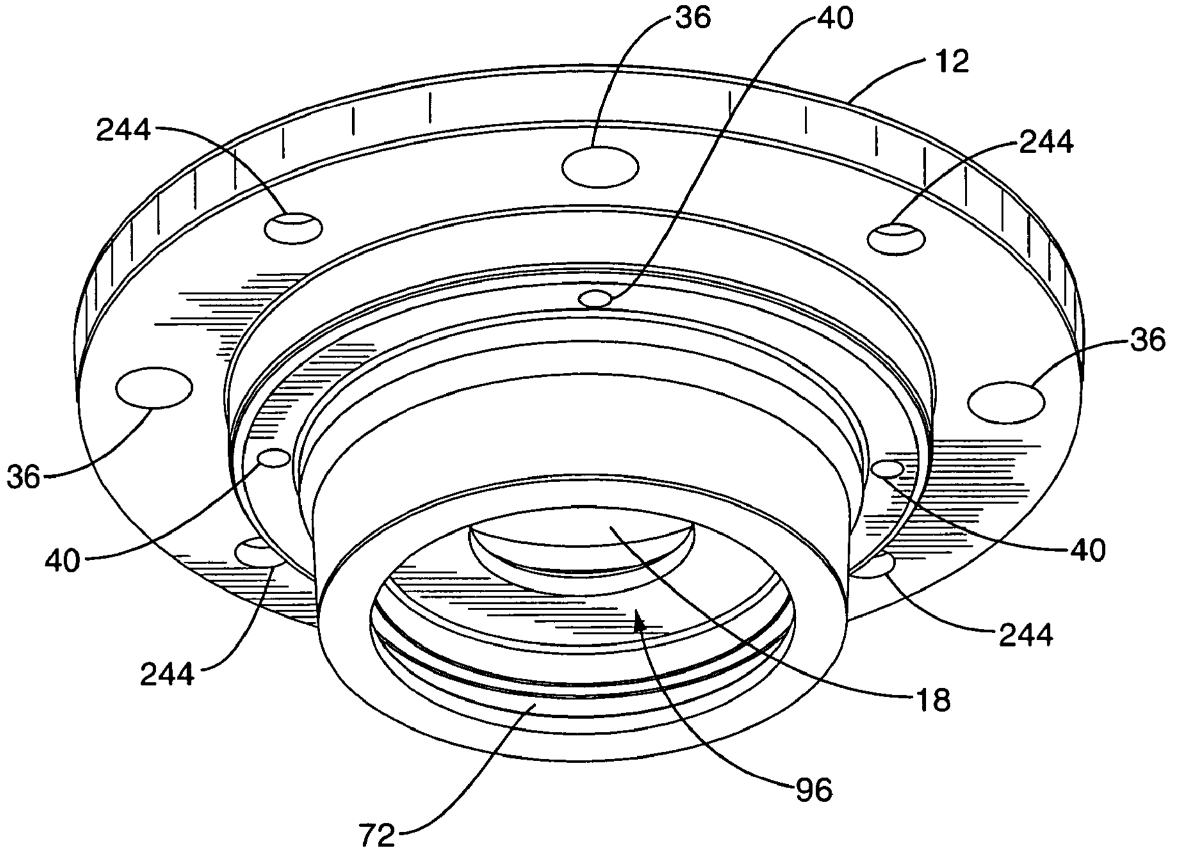
FIG. 15 is an illustration of the downstream housing of the shear valve illustrated in FIG. 10.

FIG. 15 illustrates a perspective view of the downstream housing 12 of the double-walled shear valve 10 illustrated in FIGS. 10 through 14. The upstream housing 16 and containment housing 14 are not attached to the containment housing 14 in this figure.

As illustrated, an orifice 18 is provided to allow fuel to flow therethrough through the downstream housing 12 and to exit the double-walled shear valve 10. The interstitial space orifices 40 are shown such that when the downstream housing 12 is attached to the containment housing 14, the interstitial space orifices 40 are fluidly coupled to the interstitial space 60 provided between the outer wall 68 of the downstream housing 12 and the inner wall 52 of the containment housing 14. The orifices 36 are provided in the downstream housing 12 to attach the downstream housing 16 to fuel dispenser piping 126, as illustrated in FIG. 11. Fasteners 222 are inserted into the orifices 36 to secure the two together as illustrated in FIG. 11.

Figure 16:
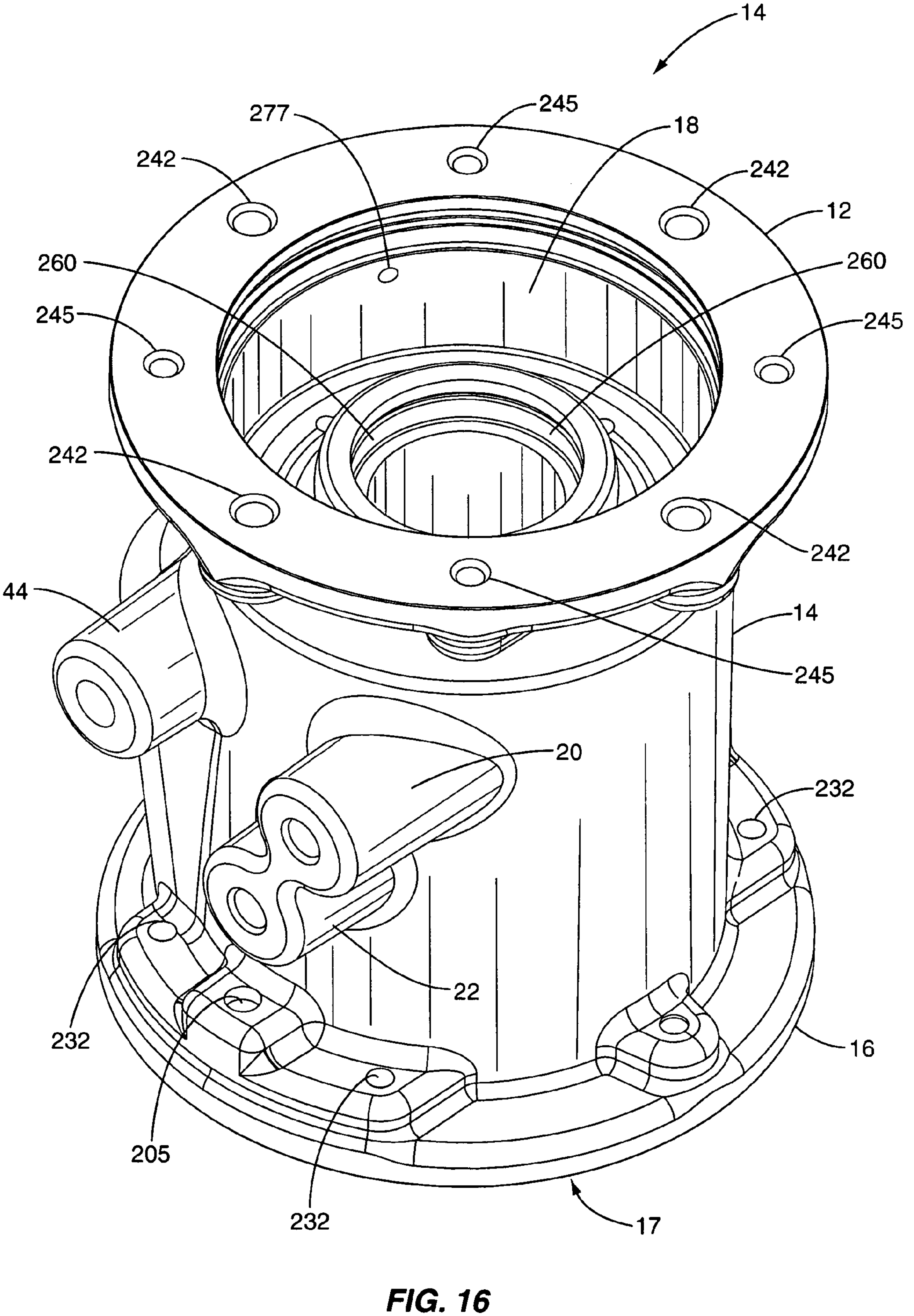
FIG. 16 is an illustration of the containment or outer housing of the shear valve illustrated in FIG. 10.

FIG. 16 illustrates a perspective view of the containment housing 14 of the double-walled shear valve 10 illustrated in FIGS. 10 through 14. The third mounting boss 44 is shown in this figure. The upstream housing 16 and the downstream housing 12 are not attached to the containment housing 14 in this figure. A port 277 is provided through the body of the containment housing 14 to allow coupling via a tube or pipe (not shown) to the interstitial space 60 for vacuum or pressure level monitoring purposes, as previously discussed above. Orifices 242 that receive fasteners 290 (see FIG. 18) via orifices 36 are illustrated.

Figure 17:
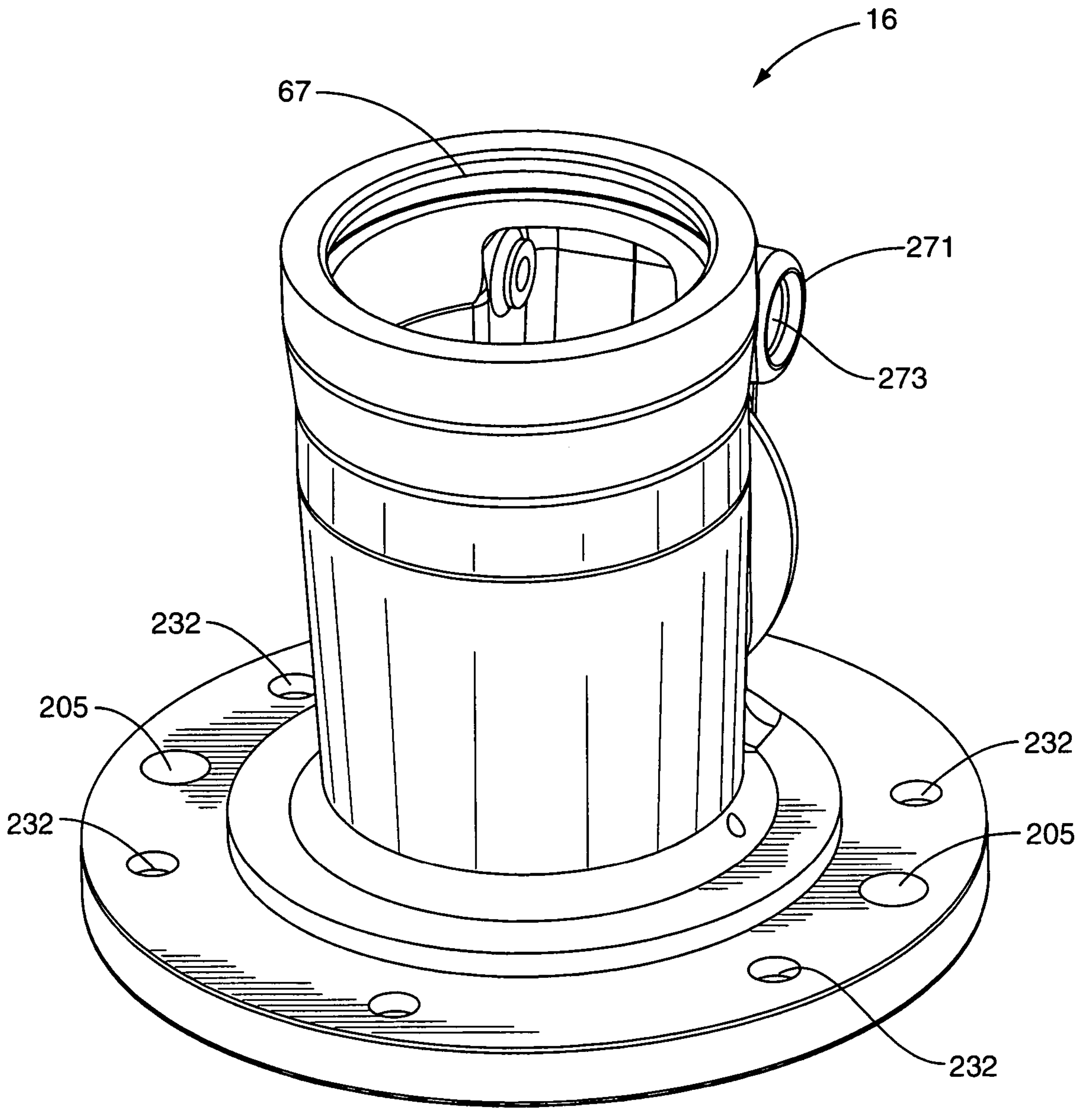
FIG. 17 is an illustration of the upstream housing of the shear valve illustrated in FIG. 10.

FIG. 17 illustrates a prospective view of the upstream housing 16 of the double-walled shear valve 10 illustrated in FIGS. 10 through 15. The containment housing 14 and the downstream housing 12 are not attached to the upstream housing 12 in this figure. A port 271 having a port orifice 273 is shown and provided for the rotatable shaft 88 to fit inside to open and close the main poppet valve 82 as describe above.

Figure 18:
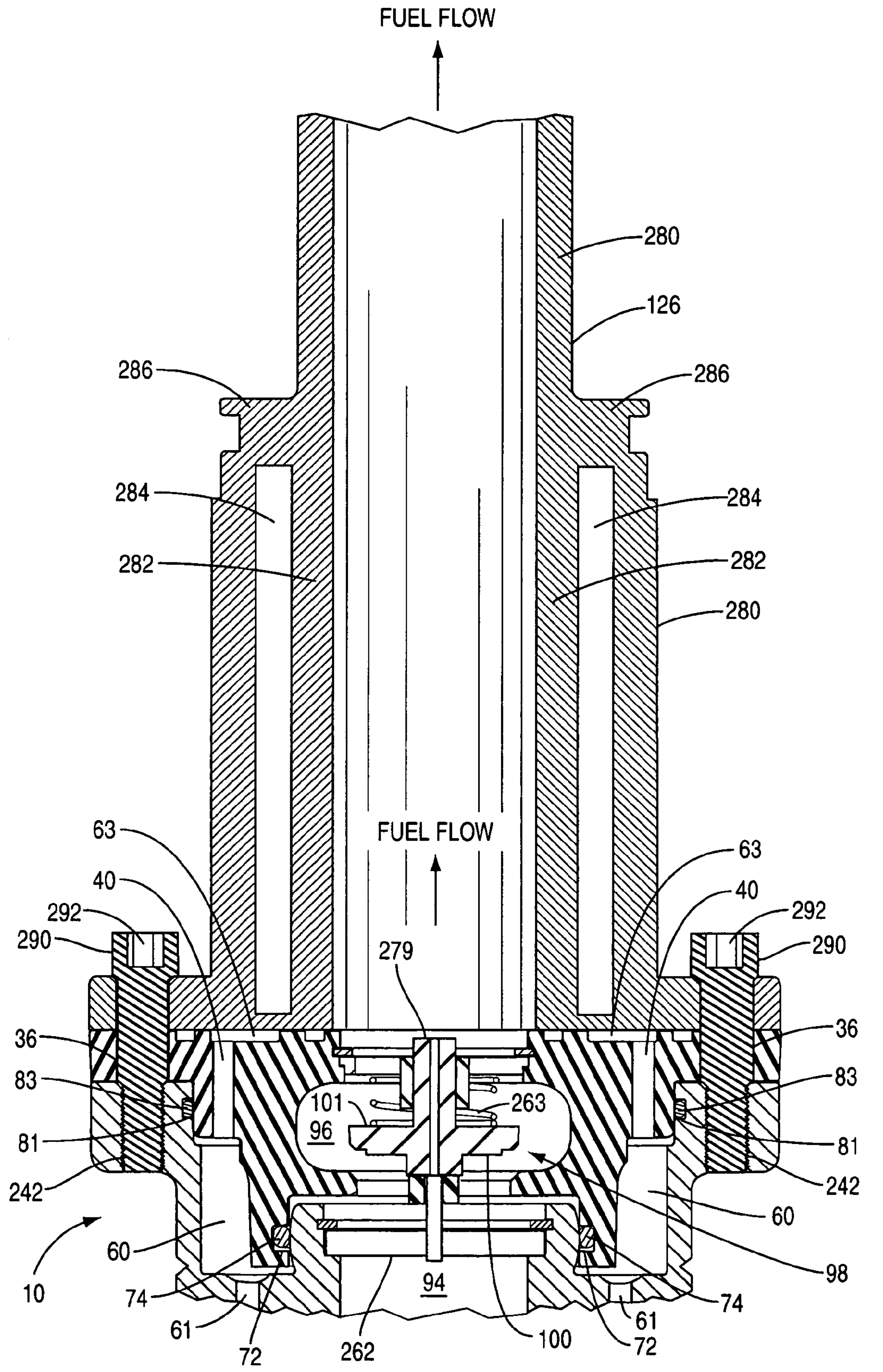
FIG. 18 is an illustration of the coupling of the interstitial space of the shear valve illustrated in FIG. 10 with an interstitial space of internal fuel piping to provide one continuously interstitial space therebetween.

FIG. 18 illustrates the double-walled shear valve 10 as illustrated in FIGS. 10 through 15 coupled to the dispenser fuel pipe 126. The dispenser fuel piping 126 is comprised of an outer piping 280 surrounding by an inner piping 282. An interstitial space 284 is formed between the inner piping 282 and the outer piping 280. The interstitial space 284 extends partially through the dispenser fuel piping 126 and is terminated at a termination point 286. The interstitial space 284 of the fuel dispenser piping 282 is coupled to the interstitial space 60 of the double-walled shear valve 10 by the attachment of the fuel dispenser piping 282 to the downstream housing 12. This is so the interstitial space 284 of the fuel dispenser piping 126 and the interstitial space 60 of the shear valve 10 form one contiguous interstitial space 60, 284 to be monitored as one zone or space. As previously described, a vacuum or pressure level generated inside the interstitial space 60, 284 can be monitored for leaks. Further, the vacuum actuator 204 will cause the main poppet valve 82 to close if a leak occurs in either the shear valve 10 or the fuel dispenser piping 126 and as described in the '504 application. The interstitial space orifice 40 is coupled to a circular grooved indention 61 formed in the top of the downstream housing 12, which couples to the interstitial space 284 of the fuel dispenser piping 282 when attached to the downstream housing 12.

Figure 19:
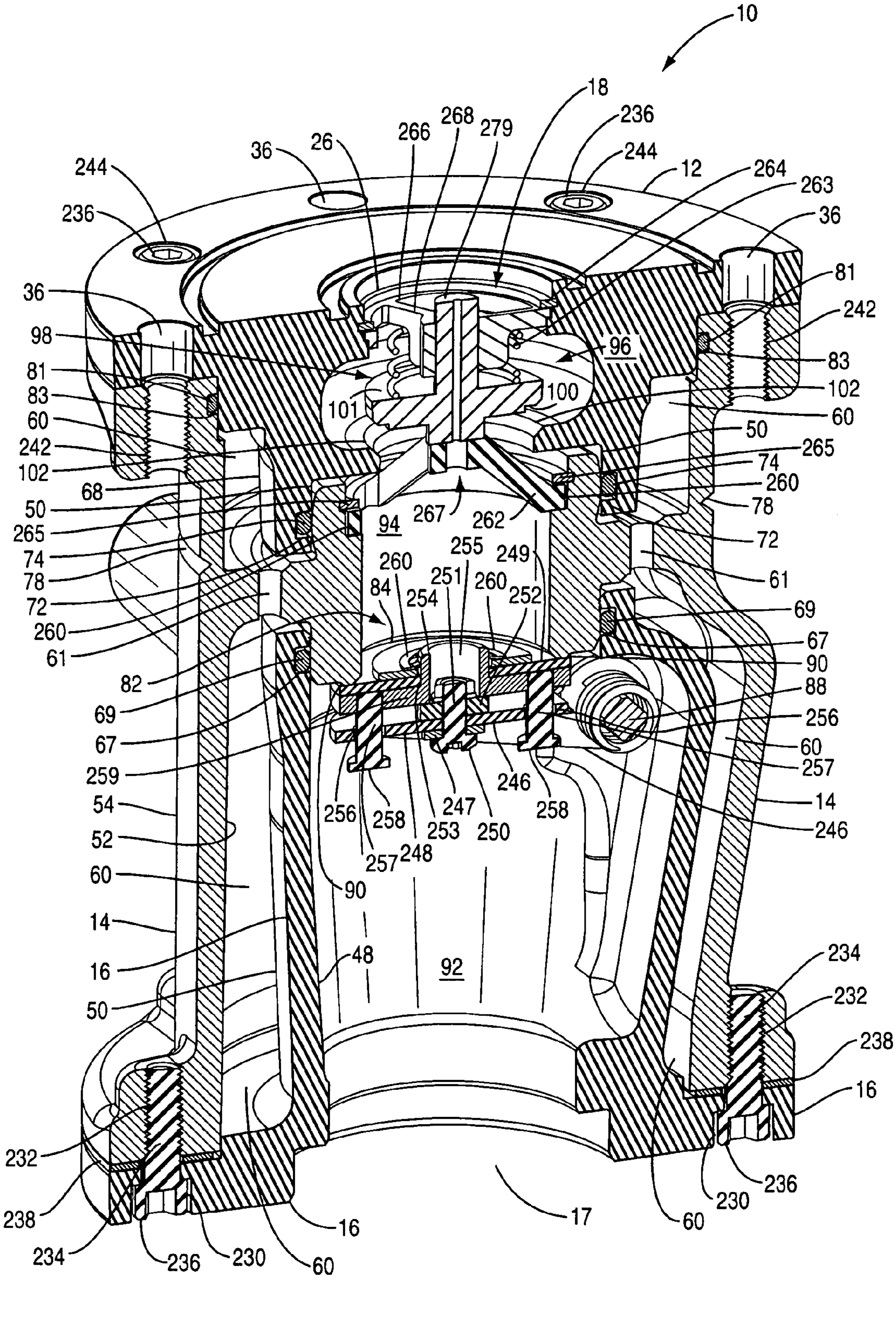
FIG. 19 is an illustration of an alternative embodiment of the shear valve illustrated in FIG. 10 with the interstitial space of the shear valve blocked from extending through the downstream housing.

FIG. 19 illustrates an alternative embodiment of the double-walled shear valve 10 illustrated in FIGS. 10 through 15. All design details of the shear valve 10 illustrated in FIG. 19 are the same as the shear valve in FIGS. 10 through 15 with the exception. The interstitial space orifices 40 and circular grooved indention 61 are not provided in the downstream housing 12. In this manner, the interstitial space 60 of the double-walled shear valve 10 is blocked off and cannot not extend through the downstream housing 12 of the double-walled shear valve 10 when attached to fuel dispenser piping 126 even if the fuel dispenser piping 126 contains an interstitial space 284 like that illustrated in FIG. 18. In this manner, only the interstitial space 60 of the shear valve 10 controls the vacuum actuator 204. A monitoring system designed to generating and/or monitor a vacuum or pressure level in the interstitial space 60 for leaks cannot be used for the fuel dispenser piping interstitial space 284 unless the shear valve 10 illustrated in FIG. 19 is used in an unintended and/or unauthorized manner.

Figure 20:
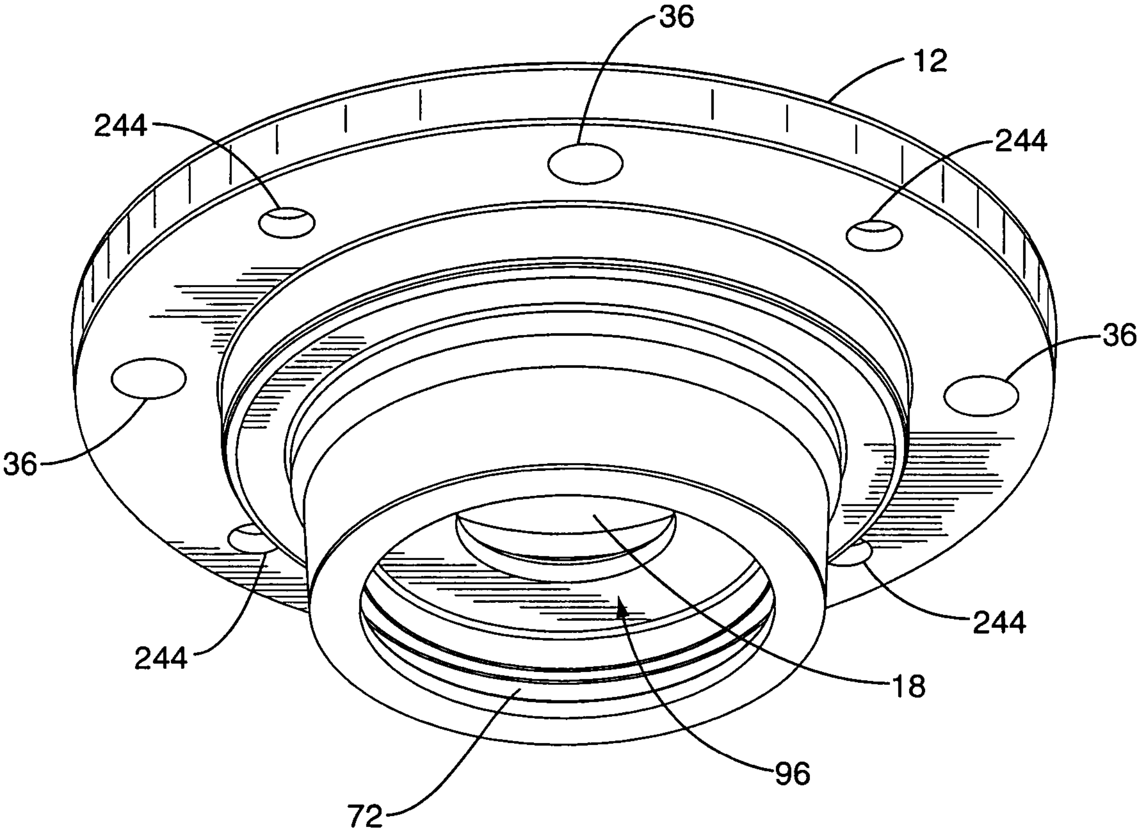
FIG. 20 is an illustration of the downstream housing used in the shear valve illustrated in FIG. 19.

FIG. 20 illustrates a perspective view of the modified downstream housing 12 used with the double-walled shear valve 10 illustrated in FIGS. 18. Note that the interstitial space orifices 40 are not provided like that included in the downstream housing 12 illustrated in FIG. 15.

Those skilled in the art will recognize improvements and modifications to the preferred embodiments of the present invention. All such improvements and modifications are considered within the scope of the concepts disclosed herein and the claims that follow.

What we claim is:

1. A double-walled shear valve that carries fuel from branch or main fuel piping to fuel dispenser piping, comprising:

a containment housing defining a shear groove on the outside circumference of the containment housing;

an inner housing defining an inner housing orifice therein forming a fuel flow path;

the inner housing coupled to the containment housing, and at least partially surrounded by the containment housing, such that an interstitial space is formed separate from the fuel flow path between the containment housing and the inner housing; and a main poppet valve coupled to the inner housing that is adapted to close the fuel flow path to prevent flow of fuel;

wherein the inner housing is further comprised of an inner housing flange coupled to an inner housing body portion having the inner housing orifice therein, wherein the inner housing flange seals off the interstitial space when the inner housing body portion is coupled to the containment housing.

2. The valve of claim 1, the inner housing comprised of:

an upstream housing coupled to the containment housing and containing an upstream housing orifice therein forming an upstream housing fuel flow path; and a downstream housing coupled to the containment housing and containing a downstream housing orifice therein forming a downstream housing fuel flow path;

the fuel flow path comprising the coupling of the upstream housing fuel flow path to the downstream housing fuel flow path via the intermediate coupling of a containment housing fuel flow path formed by a containment housing orifice within the containment housing;

a first interstitial space formed between the upstream housing and the containment housing;

a second interstitial space formed between the downstream housing and the inner housing; and the containment housing contains an interstitial space orifice that couples the first interstitial space to the second interstitial space to form the interstitial space.

3. The valve of claim 2, wherein the upstream housing is comprised of an upstream housing flange coupled to an upstream housing body portion, wherein the upstream housing flange contains a flange interstitial space orifice coupled to the interstitial space when the upstream housing body portion is coupled to the containment housing.

4. The valve of claim 2, wherein the inner housing flange is comprised of a downstream housing flange coupled to a downstream housing body portion that forms the downstream housing, wherein the downstream housing flange seals off the interstitial space when the downstream housing body portion is coupled to the containment housing.

5. The valve of claim 1, further-comprising a leak skirt that is attached to the containment housing and surrounds the circumference of the shear groove to prevent fuel from leaking to the environment through the shear groove.

6. The valve of claim 2, further comprising a seal between the containment housing and the upstream housing to form a tight seal between the containment housing and the upstream housing when the containment housing is coupled to the upstream housing.

7. The valve of claim 2, further comprising a seal between the containment housing and the downstream housing to form a tight seal between the containment housing and the downstream housing when the containment housing is coupled to the downstream housing.

8. The valve of claim 1, wherein the containment housing contains a main poppet valve seat along the inner housing orifice adapted to seat the main poppet valve when closed to close the fuel flow path.

9. The valve of claim 2, wherein the main poppet valve is coupled to the upstream housing and is adapted to close off the upstream housing fuel flow path from the containment housing fuel flow path to close off the fuel flow path in response to a shear or loss of vacuum in the interstitial space or other system having a separate interstitial space.

10. The valve of claim 9, wherein the containment housing contains a main poppet valve seat along the containment housing orifice adapted to seat the main poppet valve when closed to close off the upstream housing fuel flow path from the containment housing fuel flow path.

11. The valve of claim 9, wherein the main poppet valve is attached to a main poppet valve carrier which is attached to a rotatable shaft, wherein a force is applied to the rotatable shaft to keep the main poppet valve open.

12. The valve of claim 1, further comprising a secondary poppet valve coupled to the inner housing that is adapted to close the fuel flow path between the inner housing and the containment housing when the inner housing is separated from the containment housing to prevent backflow of fuel from the inner housing to the containment housing.

13. The valve of claim 2, further comprising a secondary poppet valve coupled to the downstream housing that is adapted to close off the downstream housing fuel flow path from the containment housing fuel flow path when the downstream housing is separated from the containment housing to prevent backflow of fuel from the downstream housing to the containment housing.

14. The valve of claim 13, wherein the secondary poppet valve is spring-loaded to bias the secondary poppet valve open to allow fuel flow from the containment housing fuel flow path to the upstream housing fuel flow path when the downstream housing is not separated from the containment housing.

15. The valve of claim 1, further comprising a port in the containment housing that is coupled to the interstitial space.

16. The valve of claim 2, further comprising a port in the containment housing that is coupled to the interstitial space.

17. The valve of claim 11, further comprising a flapper coupled between the main poppet valve carrier and the rotatable shaft, wherein the flapper contains at least one flapper orifice adapted to move about a protruded shaft attached perpendicularly to the main poppet valve carrier, wherein the flapper is adapted to apply a force to the protruding shaft to apply the force to the main poppet valve carrier when a rotational force is applied to the rotatable shaft to open the main poppet valve.

18. The valve of claim 17, wherein the main poppet valve carrier contains an inner diameter tube having an inner diameter orifice having a smaller diameter than the diameter of the containment housing fuel flow path, wherein the inner diameter tube protrudes through a main poppet head orifice in the main poppet valve and is coupled to the containment housing fuel flow path, and further comprising an inner diameter seal placed between the flapper and the inner diameter orifice, wherein the flapper is adapted to crack the inner diameter seal to begin to equalize pressure between the containment housing fuel flow path and the upstream housing fuel flow path through the inner diameter orifice, before the flapper applies a force to the protruding shaft to apply the force to the main poppet valve carrier to open the main poppet valve.

19. The valve of claim 18, wherein the main poppet valve head is secured to the inner diameter via a retaining ring that surrounds the inner diameter tube.

20. The valve of claim 13, further comprising a secondary poppet valve spring contained between a upstream housing retaining member and the secondary poppet valve to bias the secondary poppet valve closed to close off fuel flow from the containment housing fuel flow path to the upstream housing fuel flow path when an opposing force is not applied against the secondary poppet valve.

21. The valve of claim 20, wherein an inner wall of the containment housing contains an indentation around a circumference of the inner wall adapted to support a rib support within the coupling of the containment housing fuel flow path to the downstream housing fuel flow path, wherein the rib support rests against and applies an upward force against the secondary poppet valve for a rib support distance to keep the secondary poppet valve open and allow fuel flow between the containment housing fail flow path and the downstream housing fuel flow pat, when the downstream housing is securely coupled to the containment housing.

22. The valve of claim 21, wherein the rib support contains one or more rib support orifices to allow fuel to flow from the containment housing fuel flow path to the downstream housing fuel flow path when the secondary poppet valve is opened.

23. The valve of claim 22, wherein the secondary poppet valve spring causes the secondary poppet valve to seat against a secondary poppet valve seat located in the downstream housing orifice to close off fuel flow from the containment housing fuel flow path to the downstream housing fuel flow path when the downstream housing is separated from the containment housing a distance greater than the rib support distance provided against the secondary poppet valve.

24. The valve of claim 1, wherein the main poppet valve is attached to a main poppet valve carrier which is attached to a rotatable shaft extending through the containment housing, wherein a force is applied to the rotatable shaft to keep the main poppet valve open.

25. The valve of claim 24, further comprising a flapper coupled between the main poppet valve carrier and the rotatable shaft, wherein the flapper contains at least one flapper orifice adapted to move about a protruding shaft attached perpendicularly to the main poppet valve carrier, wherein the flapper is adapted to apply a force to the protruding shaft to apply the force to the main poppet valve carrier when a rotational force is applied to the rotatable shaft to open the main poppet valve.

26. The valve of claim 25, wherein the main poppet valve carrier contains an inner diameter tube having an inner diameter orifice, wherein the inner diameter tube protrudes through a main poppet head orifice in the main poppet valve and is coupled to the fuel flow path, and further comprising an inner diameter seal placed between the flapper and the inner diameter orifice, wherein the flapper is adapted to crack the inner diameter seal to begin to equalize pressure across the main poppet valve through the inner diameter orifice, before the flapper applies a force to the protruding shaft to apply the force to the main poppet valve carrier to open the main poppet valve.

27. The valve of claim 26, wherein the main poppet valve is secured to the inner diameter tube via a retaining ring that surrounds the inner diameter tube.

28. The valve of claim 1, wherein the main poppet valve closes the fuel flow path to prevent flow of fuel in response to a shear of the shear groove, fusing of a fusible link, or a loss of vacuum in the interstitial space or other system having a separate interstitial space.

* * * * *